July 21, 1970 J. G. PEARCE ET AL 3,521,001

MALICIOUS CALL HOLDING AND TRACING CIRCUIT

Filed Aug. 5, 1966 15 Sheets-Sheet 1

INVENTORS
J. G. PEARCE
W. W. PHARIS

BY Dicke + Craig

ATTORNEYS

MALICIOUS CALL HOLDING AND TRACING CIRCUIT

July 21, 1970 J. G. PEARCE ET AL 3,521,001

MALICIOUS CALL HOLDING AND TRACING CIRCUIT

Filed Aug. 5, 1966 15 Sheets-Sheet 4

MALICIOUS CALL HOLDING AND TRACING CIRCUIT

MALICIOUS CALL HOLDING AND TRACING CIRCUIT

MALICIOUS CALL HOLDING AND TRACING CIRCUIT

MALICIOUS CALL HOLDING AND TRACING CIRCUIT

Filed Aug. 5, 1966 15 Sheets-Sheet 8

MALICIOUS CALL HOLDING AND TRACING CIRCUIT

Filed Aug. 5, 1966 15 Sheets-Sheet 11

MALICIOUS CALL HOLDING AND TRACING CIRCUIT

United States Patent Office 3,521,001
Patented July 21, 1970

3,521,001
MALICIOUS CALL HOLDING AND TRACING CIRCUIT

James G. Pearce and William W. Pharis, Rochester, N.Y., assignors to Stromberg-Carlson Corporation, Rochester, N.Y., a corporation of Delaware Filed Aug. 5, 1966, Ser. No. 570,551
Int. Cl. H04m 3/22
U.S. Cl. 179—18 13 Claims

ABSTRACT OF THE DISCLOSURE

Malicious call circuit responsive to a flashing condition from a called line circuit having a proper class of service after a call has been completed thereto from a calling line circuit for automatically connecting a holding circuit to the calling line circuit connection to prevent release thereof and applying a tracing tone through the network to the calling line circuit to facilitate the tracing thereof.

The present invention relates in general to communication systems and more particularly to a malicious call holding arrangement for use in conjunction with fully automatic electronic telephone equipment.

The improper use of telephone systems as a means of furthering illegal goals with malicious intent has been and continues to be a serious problem. While the telephone system provides a convenient and highly efficient means of communication between distant parties, the lack of visual communications or means for positively identifying the calling party in a telephone connection except by voice identification provides for substantially complete absence of risk in using the telephone system for unlawful or improper purposes.

Thus, the only means for determining the indentity of a malicious caller is by physically tracing the line circuit connection from the called party through the telephone exchange equipment to the line circuit of the calling party. However, this is a slow and tedious process and requires that the calling party maintain his line circuit connection for a considerable period of time to permit completion of the tracing operation. As a result, under most circumstances, the completed tracing of the call is almost never accomplished since the malicious caller will usually release the connection before the tracing operation has provided a line circuit identification.

It is therefore an object of the invention to provide a circuit arrangement for preventing release by a calling party in a telephone circuit connection under malicious call conditions.

It is another object of the invention to provide a circuit arrangement for use in connection with automatic telephone systems wherein appropriate instruction from a called party in a telephone circuit connection between subscribers will effect automatic holding of the calling party line circuit and prevent release thereof.

It is still another object of the invention to provide a circuit arrangement for use in conjunction with automatic telephone systems for automatically applying a tracing tone through a completed connection between subscriber circuits in the direction of the calling party so as to facilitate the tracing of the connection to the calling line circuit.

It is a further object of the invention to provide a circuit arrangement in conjunction with an automatic electronic telephone system which automatically effects a holding of the calling party line circuit in a completed telephone cricuit between subscribers in combination with the application of a tracing tone to the line in the direction of the calling line circuit to determine the identity thereof.

The present invention provides a malicious call holding arrangement which may for example, be utilized in conjunction with the common control system disclosed in application Ser. No. 552,283 filed May 23, 1966 in the names of James Gordon Pearce et al. and entitled "Universal Junctor."

In accordance with the present invention, with the proper class of service recognized by the common control system, a flashing of the called subscribed handset after the call has been established will serve to associate the malicious call circuit with the supervisory equipment thereby initiating a sequenc of events which results in the holding of the calling party line circuit regardless of attempts by the subscriber to release the line connection by replacing the handset. At the same time, a tracing tone is applied from the malicious call circuit through the supervisory equipment toward the calling subscriber line circuit for purposes of facilitating the tracing of the call. Arrangement is also made in the malicous call circuit for automatically recording all voice communication transmitted between the calling and called subscribers.

These and other objects, features, and advantages of the invention will become more apparent from the following detailed description when taken in conjunction with the accompanying drawings, which disclosed one embodiment of the invention, and wherein.

Figure 3A:
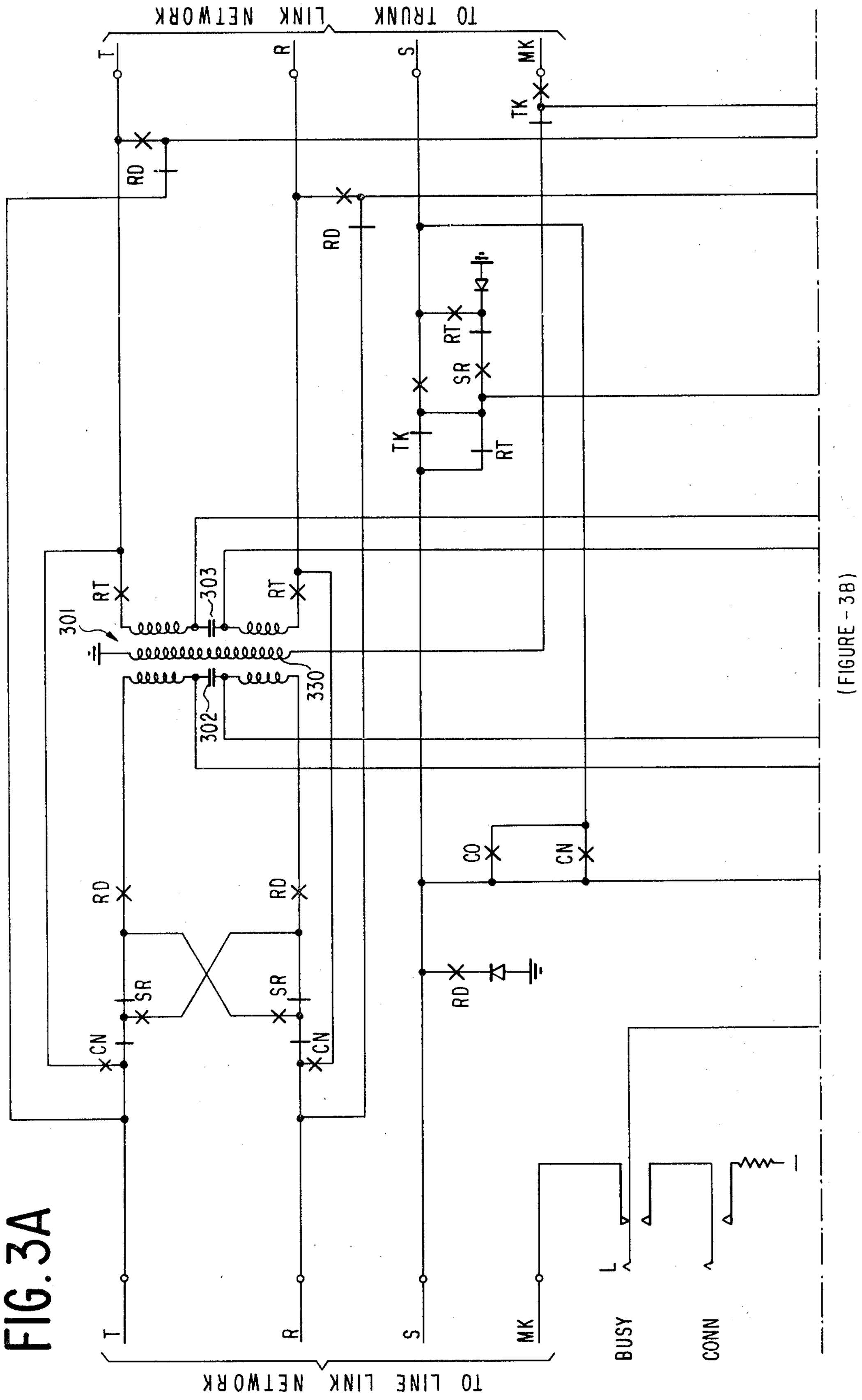
Figure 3B:
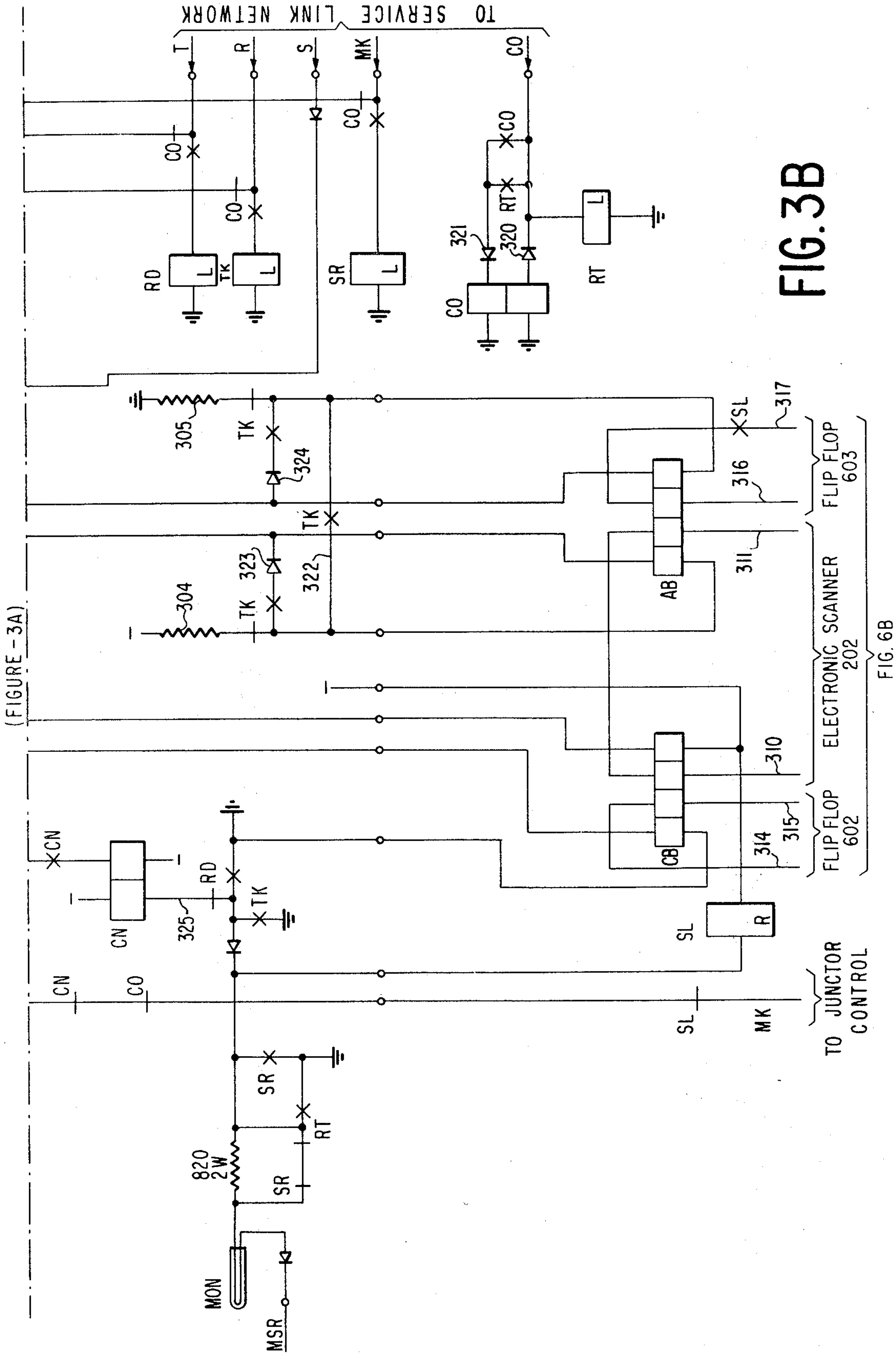
Figure 4:
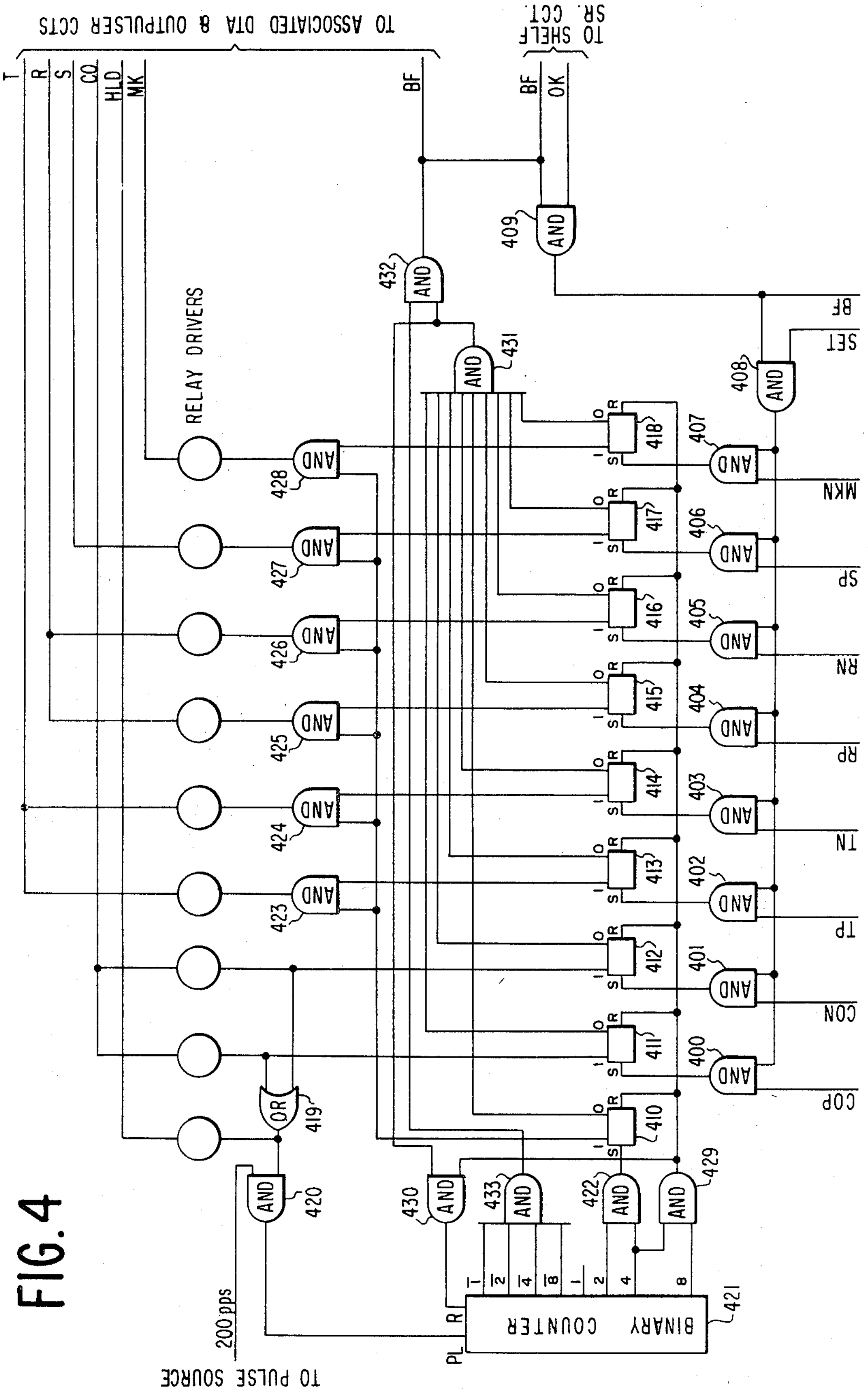
Figure 5A:
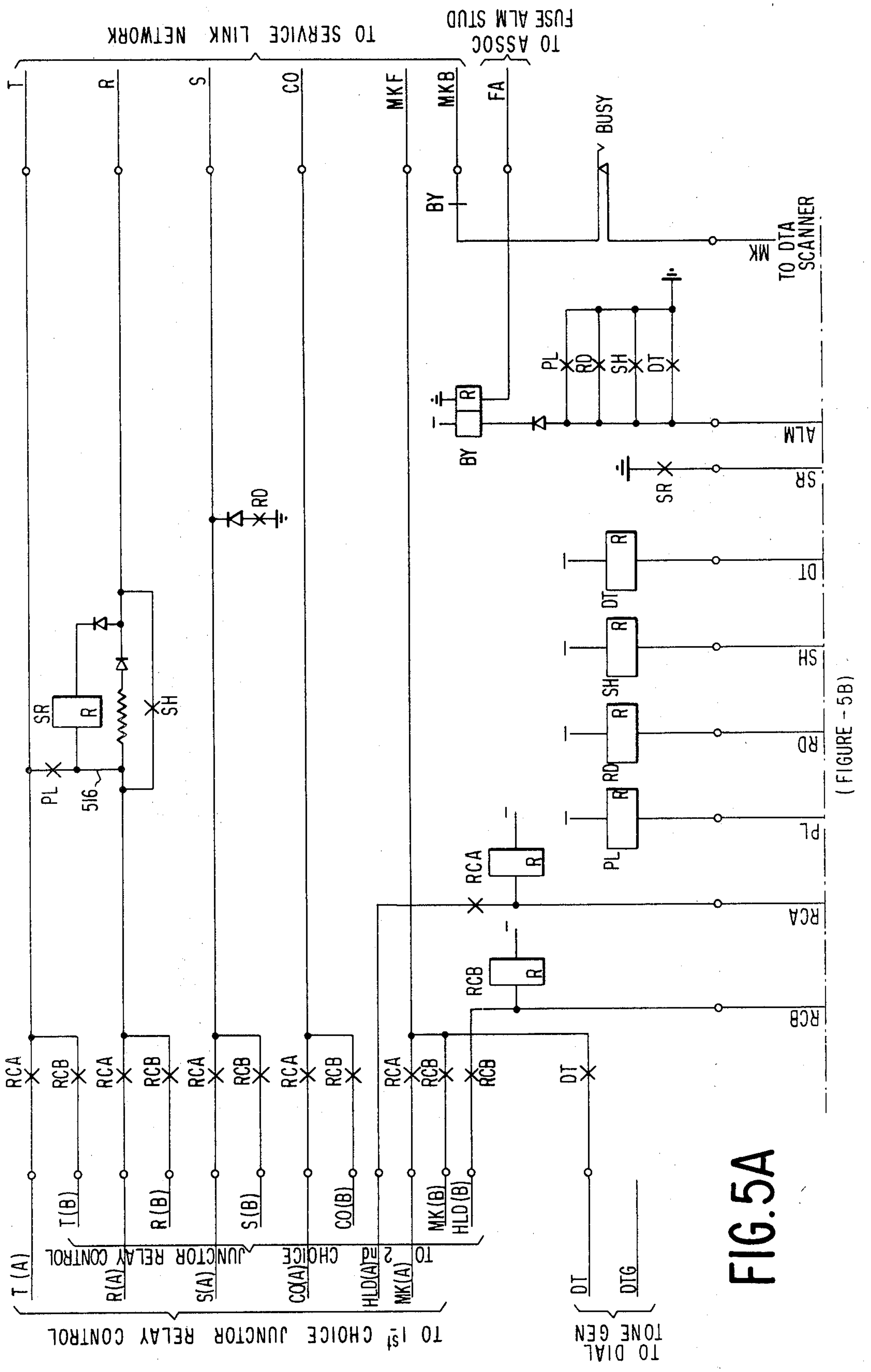
Figure 5B:
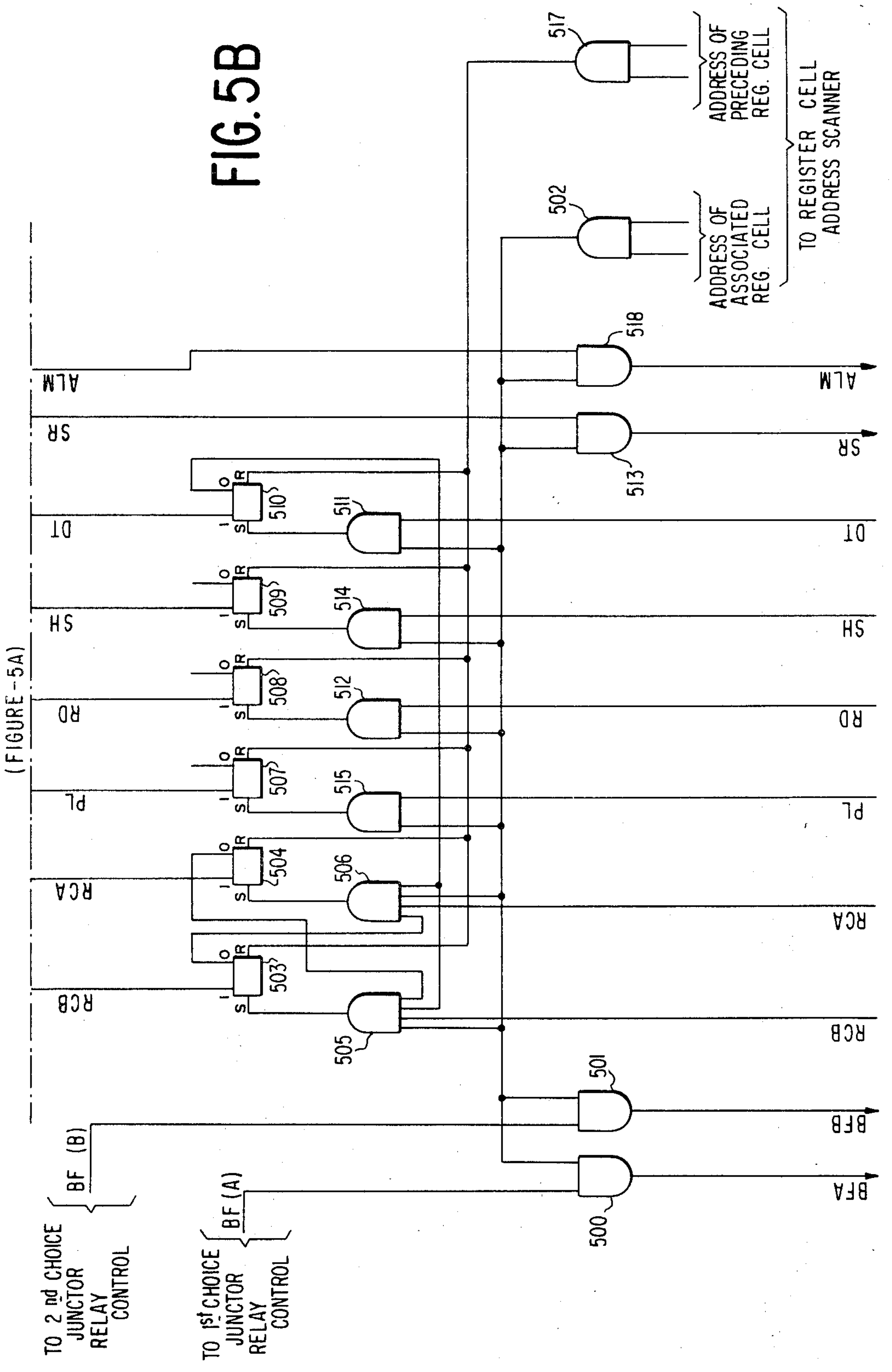
Figure 6A:
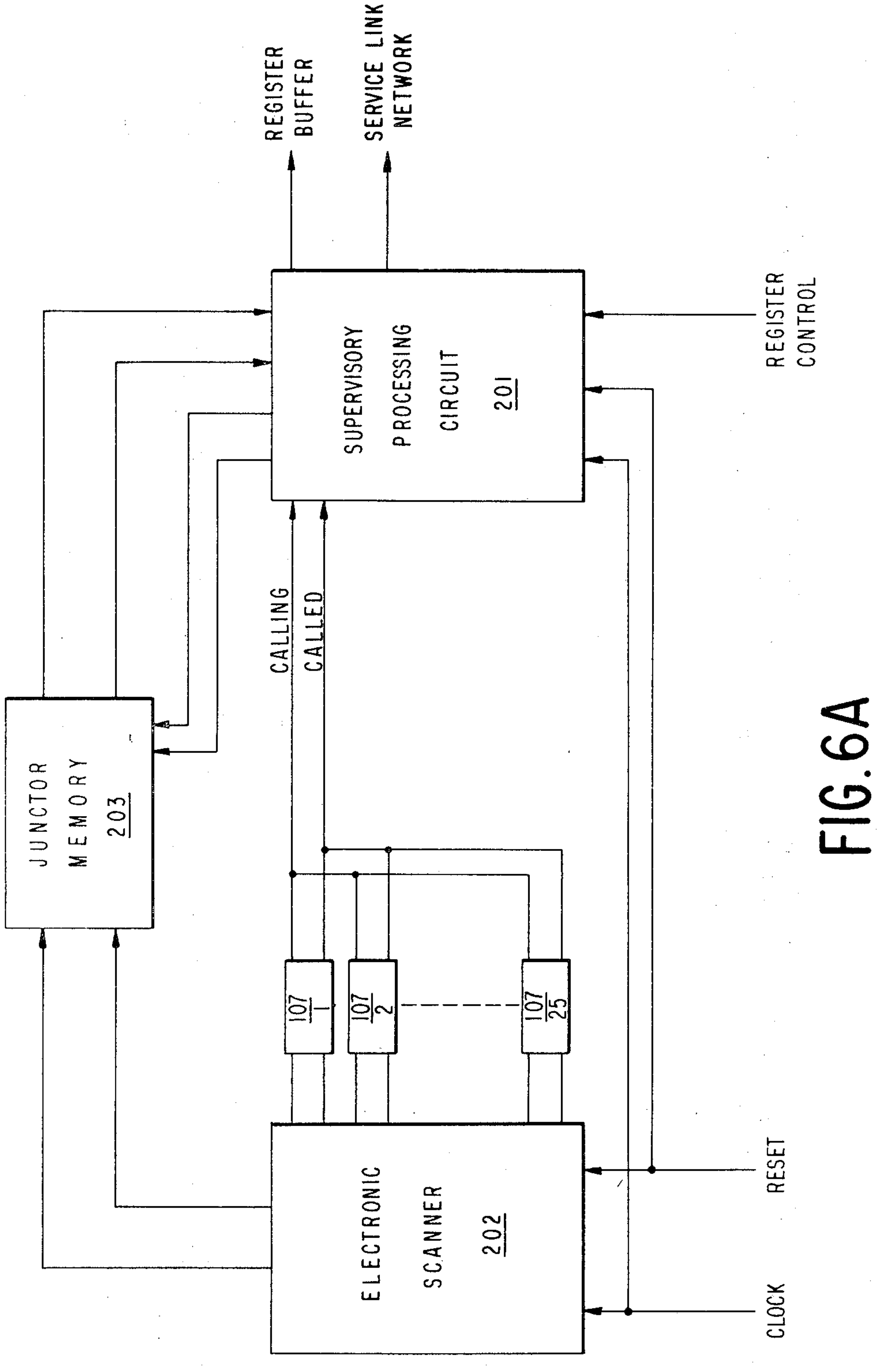
Figure 6B:
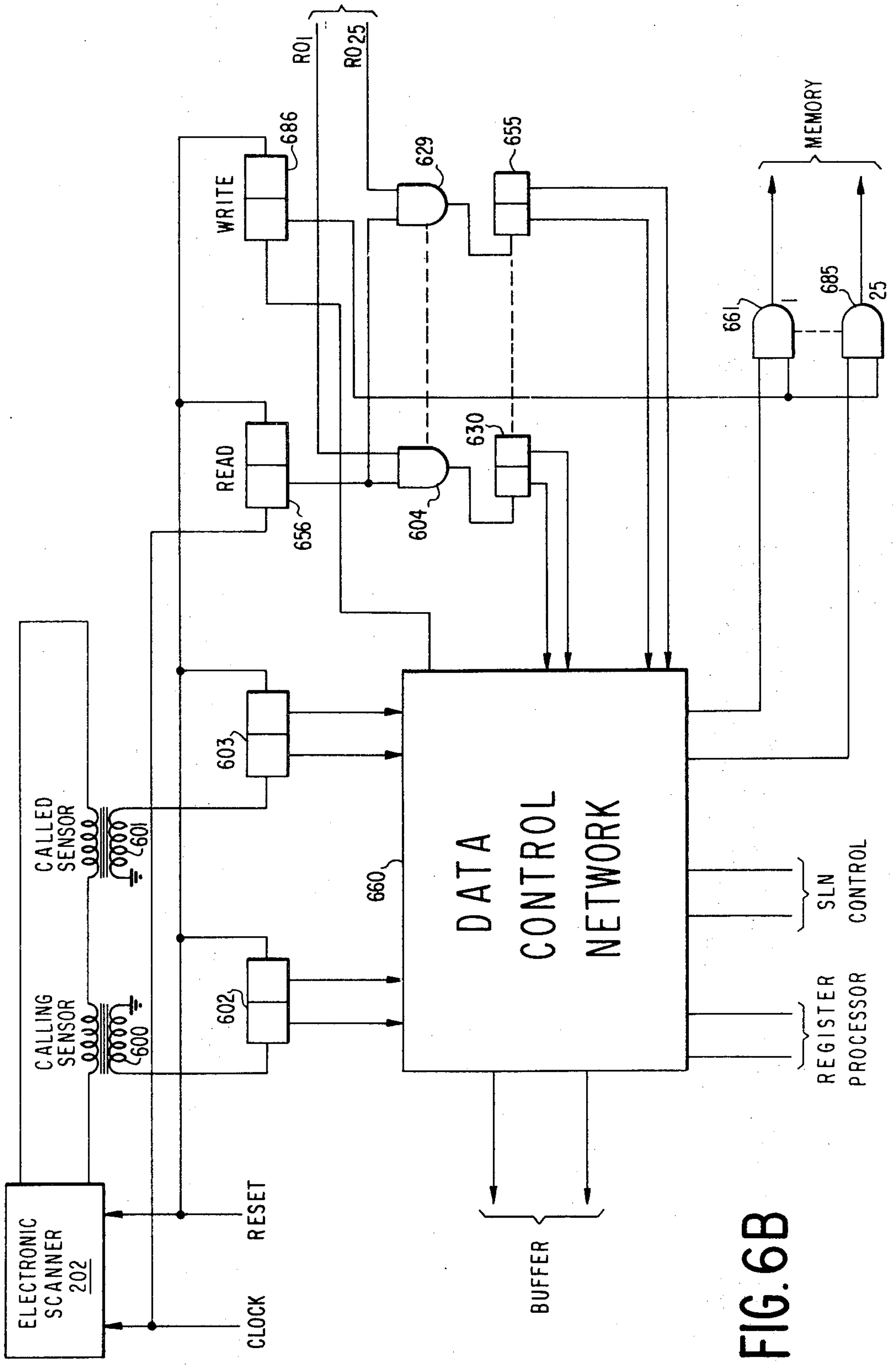
Figure 7A:
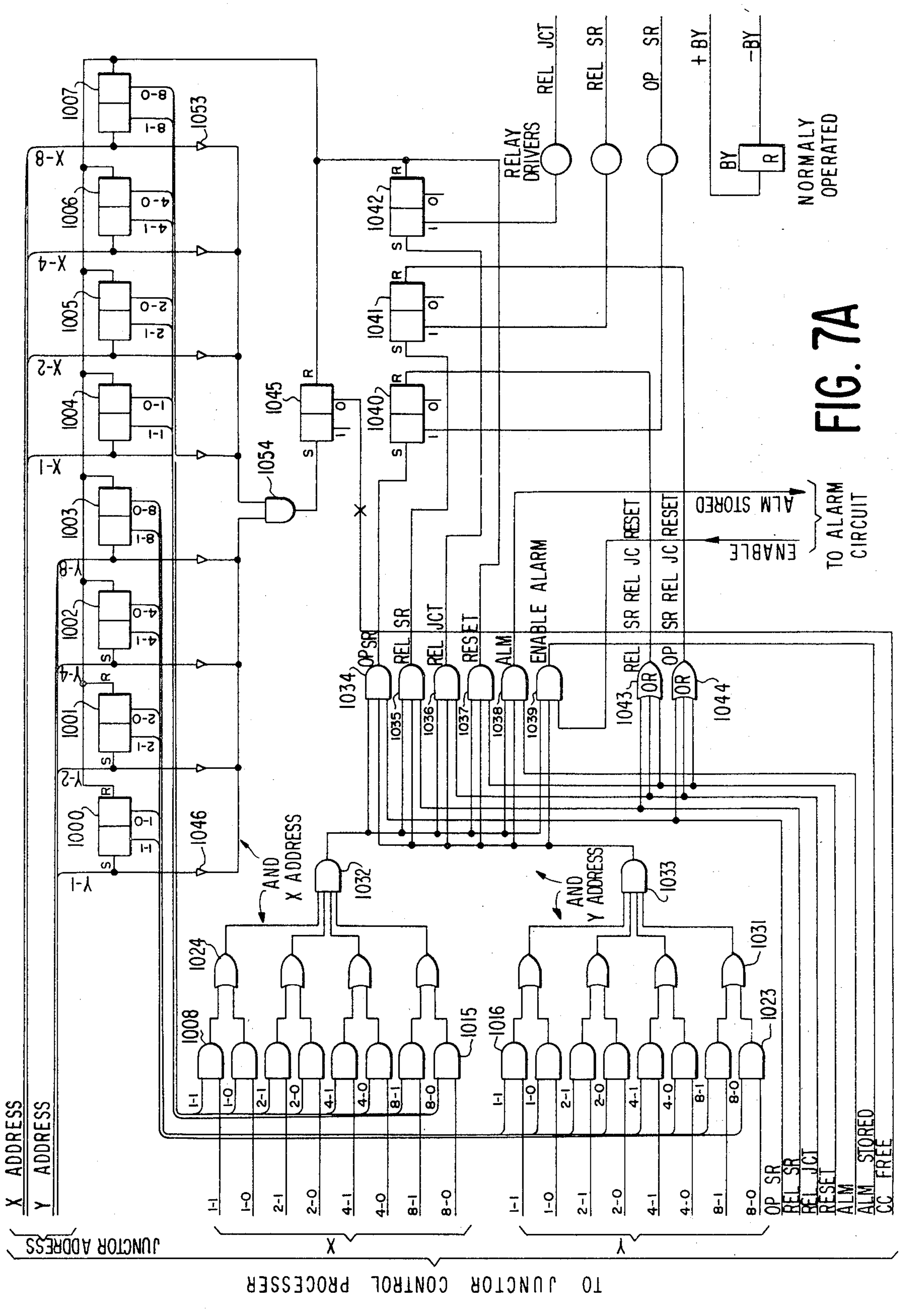
Figure 7B:
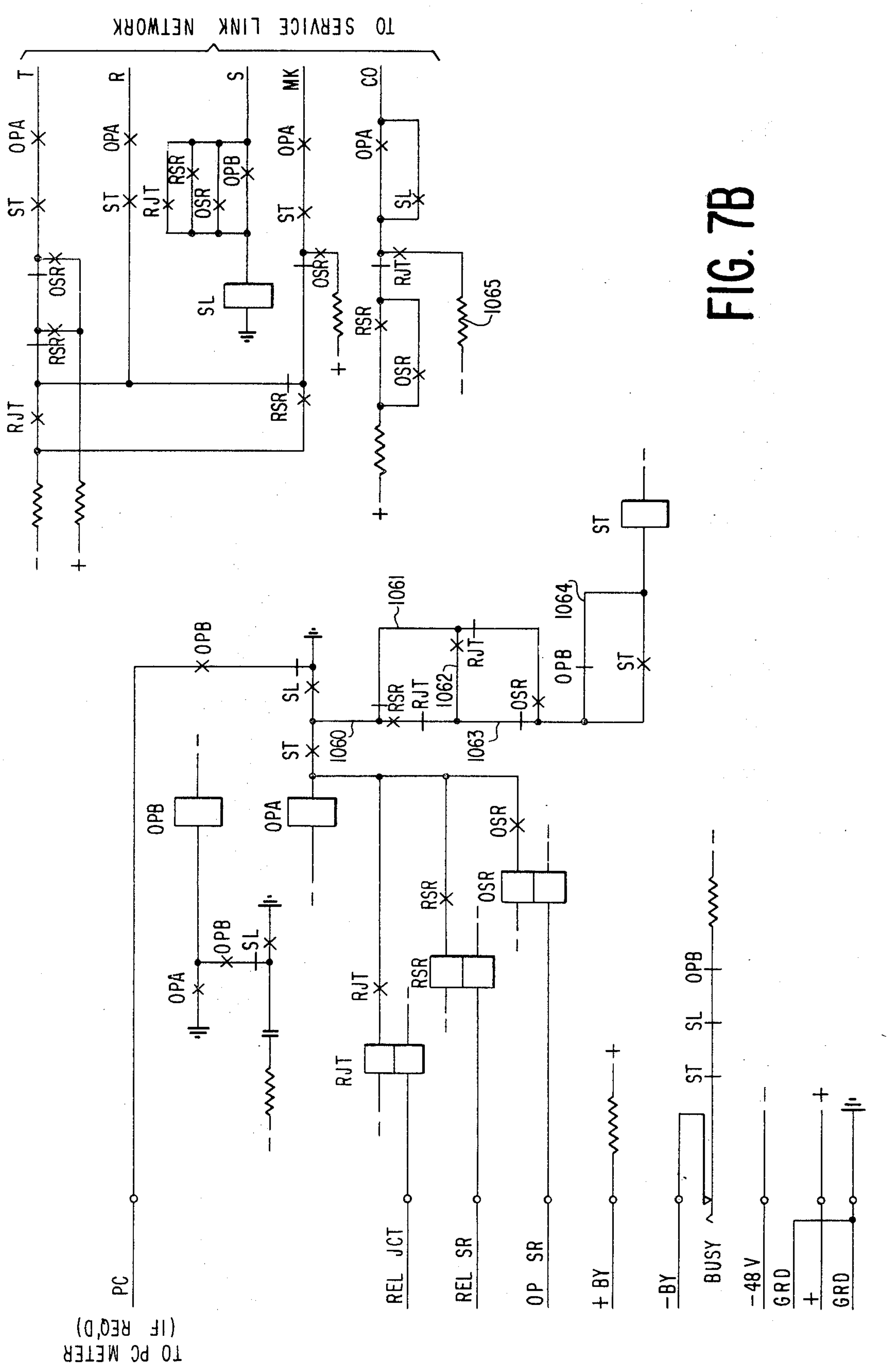
Figure 8:
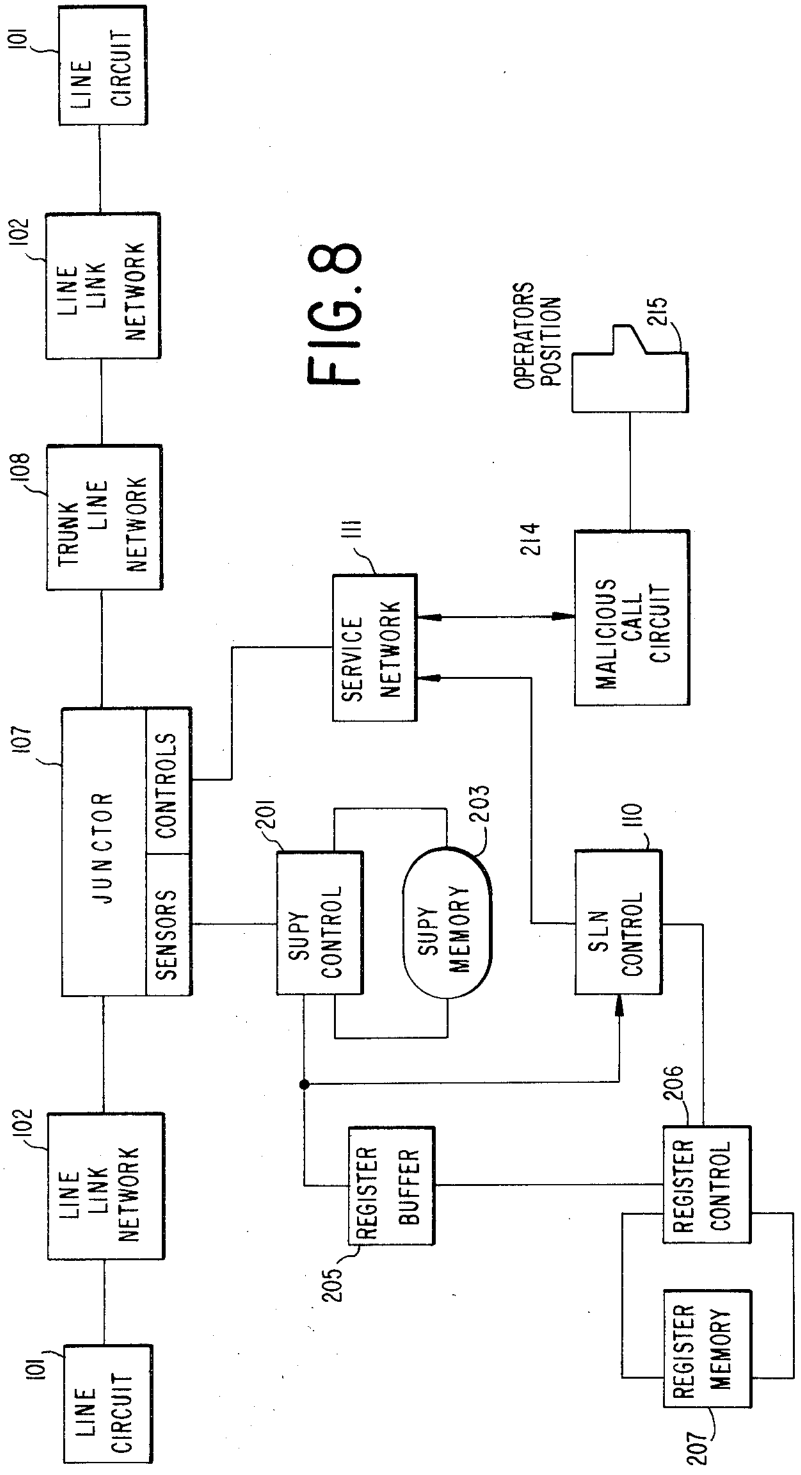
Figure 10:
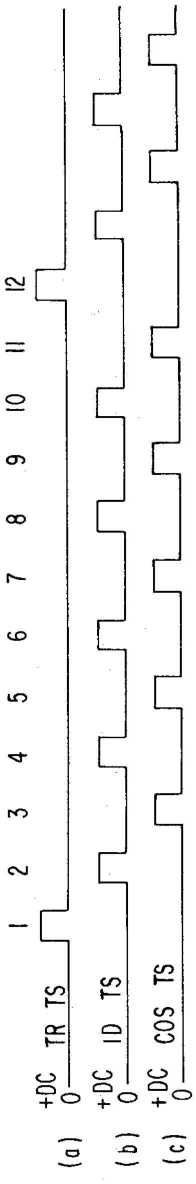
Figures 9, 11:
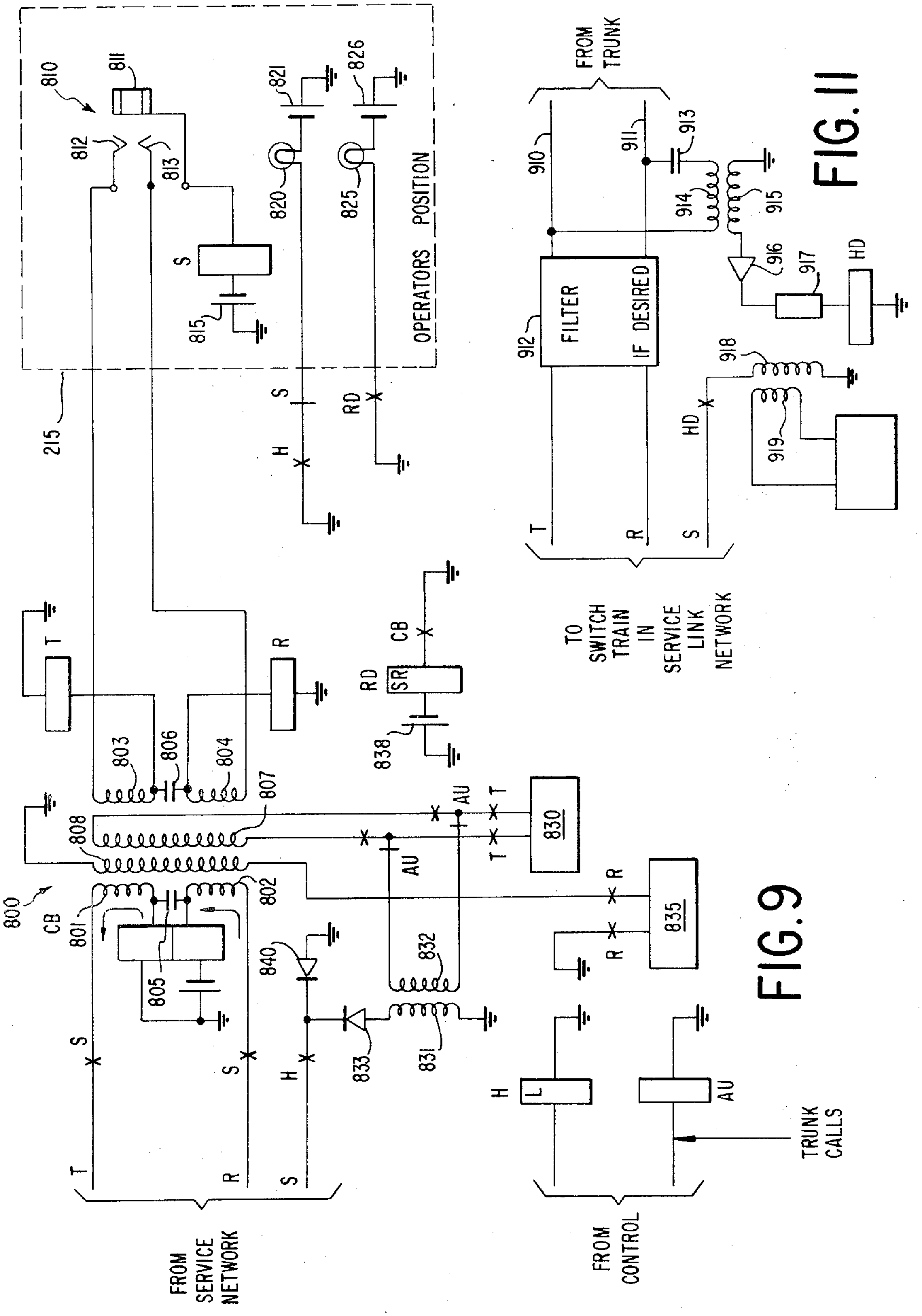

FIGS. 3A and 3B provide a circuit diagram of the junctor circuit;

FIG. 4 is a schematic diagram of the junctor control circuit;

FIGS. 5A and 5B are schematic diagrams of the dial tone applicator and out pulser circuits;

FIG. 6A is a general block diagram of the interrelationship between the plural junctors, junctor memeroy, scanner and supervisory processing circuit;

FIG. 6B is a schematic diagram of the supervisory processing circuit;

FIGS. 7A and 7B are schematic diagrams of the junctor release control;

FIG. 8 provides a general block diagram of a common control telephone system including the malicious call arrangement of the present invention;

FIG. 9 is a schematic diagram of the malicous call circuit of the invention;

FIG. 10 is a schematic diagram of the pulse waveform of the tracing tone generated in accordance with the invention in time relationship with other service pulse signals; and FIG. 11 is a schematic diagram of a terminal device in accordance with the invention for use in connection with trunk calls.

Figure 1A:
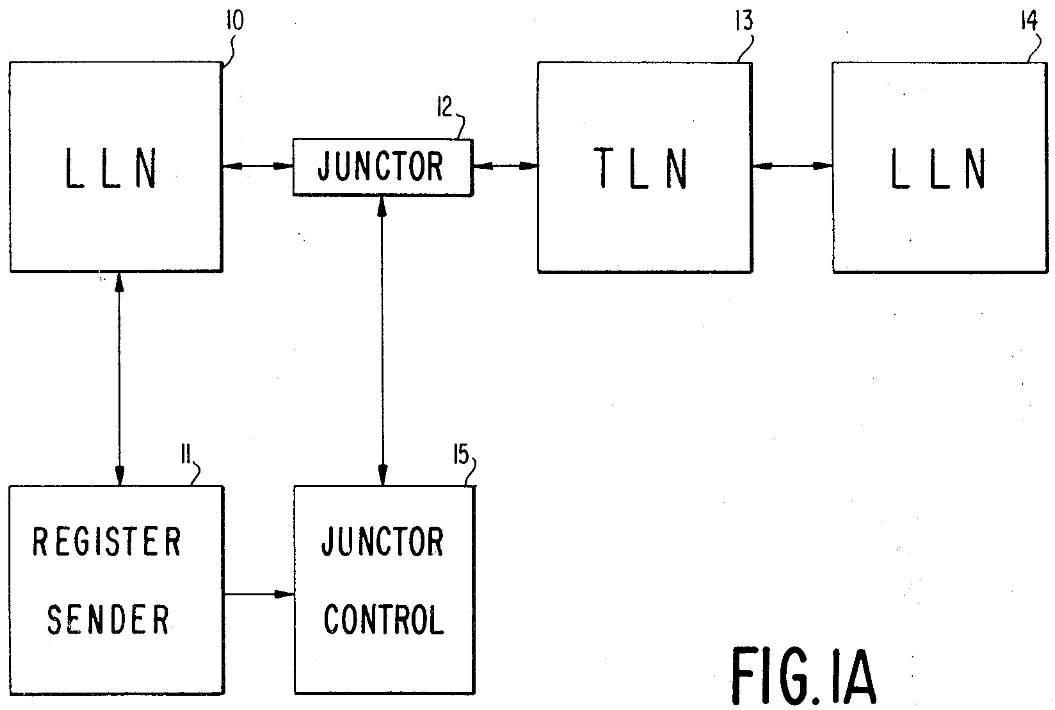
FIG. 1A is a general block diagram of a telephone system utilizing the invention.

Referring first to FIG. 1A, there is illustrated a basic block diagram of a telephone system comprising a line link network 10 including a plurality of line circuits, a trunk link network 13 and either the same or a distance line link network 14 connected to the trunk link network. A register sender 11, such as disclosed in the application Ser. No. 300,557, now U.S. Pat. No. 3,312,786 of James Gordon Pearce et al., for example, may be connected to the line link network 10 for acting during the initial stages of establishment of a call from a calling subscriber to provide proper routing information in response to dialed digits received through a universal junctor circuit 12 and a junctor control circuit 15 such as disclosed in the aforementioned application Ser. No. 552,283 of James Gordon Pearce et al., and to mark the calling and called line circuits, so that in cooperation with the junctor control 15 and universal junctor 12 a connection may be made therebetween.

Figure 1B:
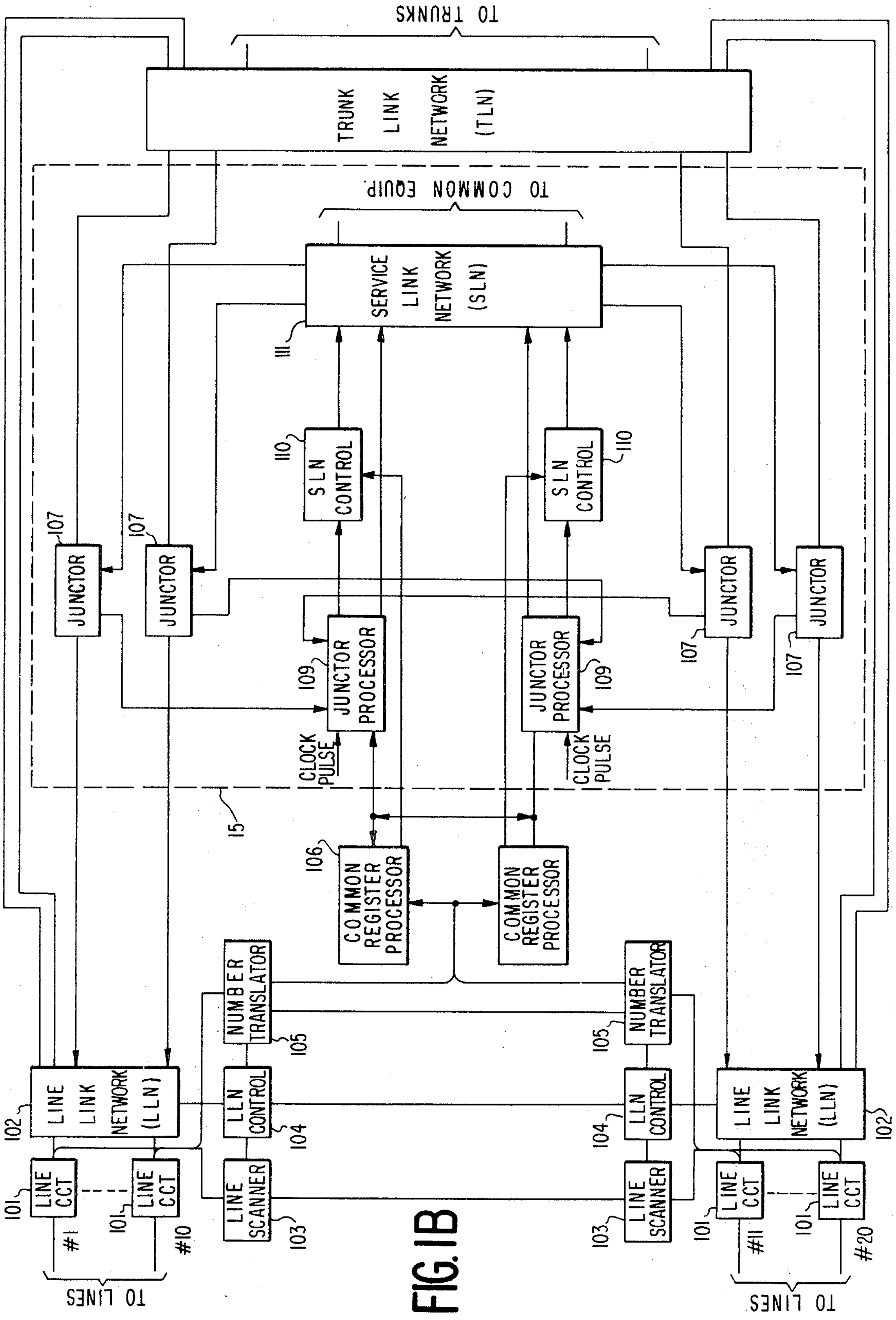
FIG. 1B is a more detailed block diagram of the system of FIG. 1A.

FIG. 1B illustrates in somewhat greater detail an overall schematic block diagram of the system of FIG. 1A. A plurality of line circuits 101 are connected in groups of ten to line link networks (LLN) 102 of which there are two provided in the illustrated embodiment for purposes of showing how a plurality of lines may be controlled. A line scanner 103 is provided for each line link network 102 and is connected to each line circuit 101 associated therewith. The line scanner 103 is in turn connected to a line link network control 104 which, upon receipt of information from the line scanner as to a closed line circuit condition, locates the closed line and marks it via the line link network 102.

The line link network control 104 is connected to a number translator 105 which is also connected to the line scanner 103 and serves to provide information regarding the directory number of the line which is calling and of the required routing and class of service information. Connected to the number translator 105 is a common register processer 106, which in accordance with its internal program memory controls the line link network control 104 to mark the calling line upon receipt of necessary information from the calling subscriber. The system described to this point is similar to the register sender system described in the aforementioned application Ser. No. 300,557 of James G. Pearce et al.

A plurality of universal junctor circuits which connect the line link network 102 through a trunk link network 108 back to the line link network 102 or to outgoing trunk circuits as required are associated with junctor processor circuits 109 on a time division multiplex basis, the junctors associated with each junctor processer circuit being scanned repeatedly every ten milliseconds by the junctor processer to monitor the condition of the line circuits to which the individual junctors are connected. The junctor processer 109 detects the condition of the line circuit to which the individual junctor 107 is connected, returns dial tone to the calling party in response to control by the common register processer 106, detects dialed impulses via the line link network 102 and junctor 107, applies the dialed digits and other information regarding the condition of the line circuit to the common register processer 106, applies ringing and ring back to the called and calling parties in response to control from the common register processer 106 and controls the relays in the junctor 107 via a service link network control 110 and service link network 111 to provide connection between the various common circuits through the junctor to the calling and called line circuits. The junctor processer 109 also continuously monitors the transmission circuits to which the junctors 107 associated therewith are connected to provide supervisory control and response to service requests by either the calling or called parties.

Figure 2A:
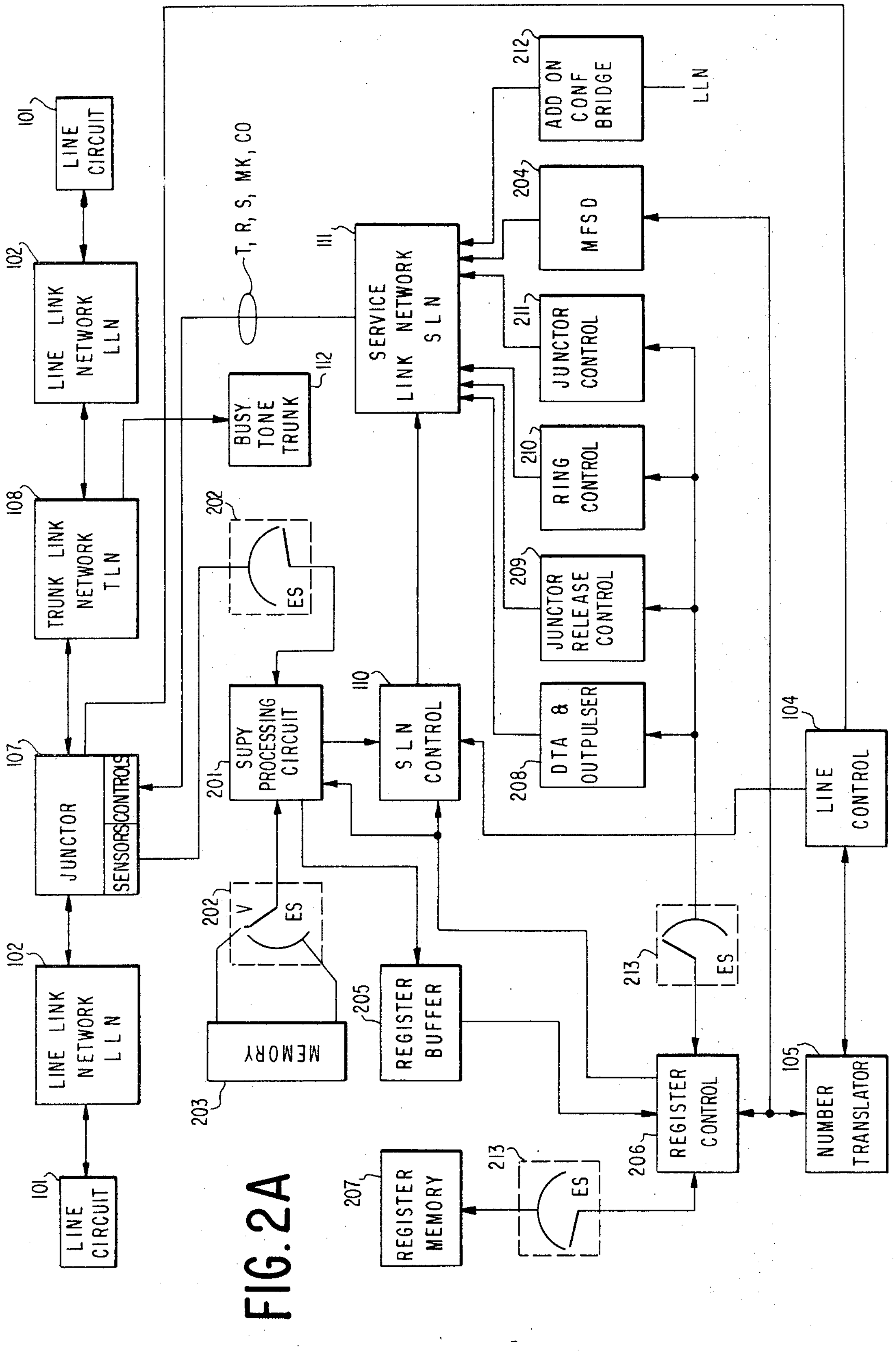
FIG. 2A is a block diagram illustrating the components of the invention and therein association with the other elements of the system.

A general block diagram of the junctor processer 109, together with a single junctor 107 to which it is periodically connected, the service link network 111 and service link network control 110 are illustrated in FIG. 2A. The junctor circuit 107 provides an interface between the line link network 102, the trunk link network 108, and the service network which includes the service link network 111, the service link network control 110, the junctor processer 109 and the common register processer 106 in the register sender. This junctor serves both as an originating and terminating junctor, and is arranged so that it has no inherent decision-making circuitry and therefore is a slave to a processing control which obtains access to the calling and called lines via the sensors in the junctor itself.

Each junctor 107 is connected to a junctor processing circuit previously designated 109 and now called the supervisory processing circuit 201 on a time share basis by an electronic scanner 202 which simultaneously connects a junctor memory 203 to the supervisory processing circuit with the interconnection between the circuit elements being effected at the time when a segment of the memory 203 allocated to the particular junctor is available. This supervisory processing circuit 201 determines the condition of the line circuit by way of the sensors in the junctor 107 and compares this condition during each scan with the previous condition of the line circuit as stored in the junctor memory 203. Each of the junctors is scanned once every ten milliseconds so that a dialing impulse of 20 millisecond duration will be detected at least twice, thereby determining that it is a dialing impulse rather than a spurious signal such as an intermittent contact or other meaningless indication.

Figure 2B:
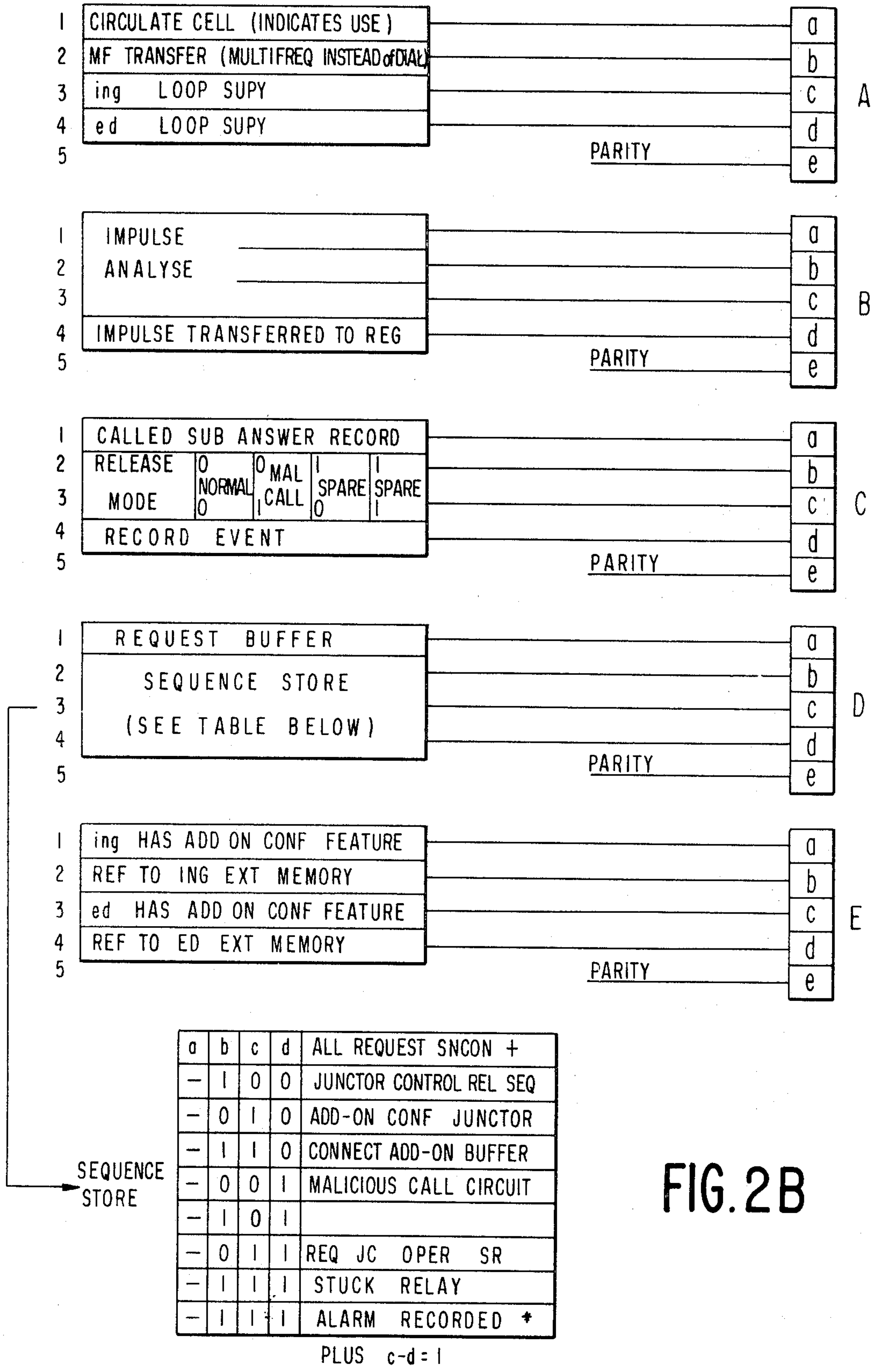
FIG. 2B is a table indicating the allocation of the various information bits to particular subject matter.

The memory 203 will contain a segment for each junctor which is periodically connected to the associated supervisory processing circuit 201. In other words, there will be as many segments in the memory 203 as there are junctors 107 associated with a given supervisory processing circuit 201. The memory 203 may be either recirculating or random access and each segment of the memory typically contains 25 bits of information or instruction as shown in FIG. 2B although it should be understood that any convenient number of bits can in fact be used. The 25 bits of the memory are divided into five bit characters, of which the fifth or last bit of each character is provided as a parity or checking bit. The bit characters provide for a grouping of the bits into semi-related functions such as monitoring of the line circuits, timing functions, and various instructions utilized for control of the service network. The bits which make up each character within each segment of the memory are schematically disclosed in FIG. 2B. These characters may be regarded as subregisters for retaining binary bits which are continually being altered and which are a function of data derived from the particular junctor associated with that segment of the memory and data derived from the common register processer.

The first character A of FIG. 2B of each segment is used to indicate that the segment is in use. A bit in position 1 of character A indicates that the segment is in use and permits the writing or manipulation of information in the other characters in the memory segment. If no such bit occurs in the first position, then information available to the memory is not recorded and no action is taken on such information. A bit in position 2 of the first character A indicates that transfer is multi-frequency instead of dial, as for instance, if the call is originating from a tone dial telephone. In a case of a bit in this second position, the supervisory processing circuit connects through the service link network to a multi-frequency signal detector 204 transferring the multi-frequency signals to this circuit element for translation and direct application to register control 206. Bits in positions 3 and 4 of character A of the memory segment indicate the state of the calling and called loops, respectively, a bit indicating an open line condition and a zero, indicating a closed line condition. The fifth position of character A as in the other characters of the memory segment is reserved for the parity or checking bit.

The second character B of the memory segment is used for impulse analyzing and controls the analysis of the durations of time for which the calling or called line is open or closed. Positions 1, 2 and 3 of character B provide for a three bit binary counting sequence. These three bits are used to keep a record of the length of time for which the calling loop is either open or closed. The method whereby this is achieved is as follows:

At the particular interval of time during which a particular junctor is associated with the junctor processer 109 the state of the calling loop is recorded. Ten milliseconds later when the same junctor is again scanned the state of the loop is again examined. If the state is the same as it was previously the counter is stepped one and thereby records the fact that the loop is opened for a period long enough to constitute either an impulse or the final release conditions of the call. The discrimination between these two states is accomplished by reversing the function of the sensors and checking for a change of state of the calling loop from off-hook to on-hook. If the open circuit represents an impulse then the change of state of the loop will occur within a defined period. On the other hand, if the call has been terminated then no such change of state will be recorded, and, hence, the counter will reach its maximum position as an indication of this. The three bits, therefore, keep a record of the time of opened or closed loop conditions.

The fourth position of character B of the memory segment provides indication of whether or not an impulse received by the junctor and sensed by the supervisory processing circuit has been transferred to the common register processor 106. The fifth position of the character contains the parity bit.

Character C of each memory segment is utilized as a monitoring of line conditions and functions within the control system and also serves as a means for controlling release or connection of time shared equipment. A bit in the first position of character C is used to record the fact that the called subscriber has answered so that special sequences of events may be initiated which relate to functions required after the called subscriber has answered. For example, a bit in the first position of character C indicating that interconnection between the calling and called subscribers has been completed, serves as a means for distinguishing impulses received over the calling or called lines as a flashing condition requiring recalling of time shared equipment such as the malicious call circuit of the present invention rather than a dial condition which would require a different sequence of events. This first position of character C is also used to indicate that the called loop may instigate a release condition of the loop called remains open for greater than an assigned or predetermined period of time. The second and third positions in character C in each segment are used for release modes and control the manner in which the call can be released. For example, specific combinations of the two bits are alloted to a normal release (00) and to the malicious call (01) arrangement of the present invention to be described in detail hereinafter. Under the malicious call release a sequence of events is started with the flashing of the receiver by the called party—when the calling party attempts to release—to hold the line circuit to the calling party until tracing of this circuit can be completed. The fourth position of the character C serves as a means of recording occurrence and completion of a sequence of events and provides a sort of scratch pad note to be made of this fact, which information is utilized in control of any of the following sequences. The fifth position of character C provides the parity or checking bit.

The fourth character D consists largely of a sequence store which determines what action has been taken by the processing circuit 201 when it has been seized. The first position of this character is used for instruction purposes to request the buffer 205 for transferring impulses or information for the supervisory processing circuit to the common register processor 106. The second, third and fourth positions of the character provide various combination of bits which indicate the various sequences which are to be carried out by the control system. For example, indications that the signal network control has been seized and either a junctor control is associated with the call in order to release the junctor, or that the signal control has to be seized and the malicious call circuit connected through the service link network and the junctor to the transmission circuit is indicated by the various bit combinations indicated as FIG. 2B. In response to insertion of the bits in the proper positions in character D requiring certain sequences or the request of a buffer, control is effected through the service link network control and service link network to the various common circuits, which are available on a time share basis, for acquisition into the system at that time. The fifth position of the character D provides the parity or checking bit.

The character E contains basic information as to the classes of service of the calling and called subscribers with position 1 of the character indicating whether or not the calling party has add-on conference features, position 2 indicating the necessity to refer the calling party to an external memory in order, for example, to accommodate abbreviated dialing from a caller. Positions 3 and 4 of the character perform similar operations as positions 1 and 2 but refer to the called subscriber. Position 5 of the character provides the parity or checking bit.

Referring once again to FIG. 2A, the supervisory processing circuit 201 examines and acts upon the stored information in the memory and information received from the systems in the junctor 107 and as a result of this information it either connects to a register buffer 205 or to the service link network control 110. The service link network control 110 controls the crosspoints in the service link network 111 so as to interconnect the various common circuits with the junctor in control thereof. The register buffer 205 provides a means of associating the scanner, which is used for building up dialed digits, with the supervisory processing circuit and junctor memory operating on a time division multiplex basis with registers which store the digits and are provided on a traffic basis. In view of the asynchronous operation between the supervisory processing circuit 201 and the common register processor 106 a speed buffer of some type is required in between the two circuits so that information may be transferred from the supervisory processing circuit 201 during a given scan of the junctor 107 and the junctor memory 203 with storage of the information or impulses in the register buffer being provided until access is available to the common register processor 106.

The common register processer 106 includes a register control 206 which performs timing and control functions and serves to transfer received impulses to the register sender system for further processing. Associated with the register control 206 on a time share basis is a register memory 207 and a dial tone applicator and outpulser circuit 208. The register memory 207 provides a segment for each of a plurality of dial tone applicators and outpulsers 208 and is capable of storing the address of the junctor associated with the outpulser circuit and of retaining dial impulses for transfer via the register control 206 to the number translator 105 in the register sender.

The dial tone applicator and outpulser 208 controls the initial setting up of a call including application of dial tone and control of receipt of dialed impulses to the supervisory processing circuit in response to the register control 206. The register control 206 also provides control via the service link network control 110 and the service link network 111 of the various common circuits which are to be connected metallically through to the junctor. Either the supervisory processing circuit 201 or the register control 206 are capable of effecting such a metallic connection between the common circuits and the junctor via the service link network control 110 and the service link network 111 in response to control functions set up in either of these circuits.

The common circuits which perform the necessary service control may include, for example, a junctor release control 209, a ringing control 210, a junctor control 211, a multi-frequency signal detector 204, and add-on conference bridge 212. In addition, a malicious call circuit in accordance with the present invention is provided in the system on a time share basis in the manner of the other common circuits.

A brief description of the sequence of events and functions which make up the control procedure for setting up a call will provide a clearer understanding of the functions and relationships between the various circuit elements which are described above and therefore will provide a proper basis for understanding the operation of the malicious call circuit of the present invention, discussed in detail thereafter. At the time a call is originated, the line scanner 103 detects an open line in a line circuit 101 and signals line link network control 104, which through the line link network 102 seeks out the open line and marks it in the conventional manner. At the same time, the line control 104 scans the junctors and dial tone applicator out-pulser circuits to find an available one of each which is not at that time in use. The available DTA circuit 208 and junctor 107 are each marked to indicate seized condition and the address of the selected junctor 107 is inserted via the register control 206 into the register memory 207 in the segment therein reserved for the particular DTA 208 which is marked. An electronic scanner 213 is provided between the plurality of DTA circuits 208, the register control 206, and the register memory 207 so that the register control is connected in turn to each DTA circuit at the time which its particular segment of the register memory 207 is available to the register control 206.

The DTA and outpulser circuit 208, the operation of which is described in detail hereinafter, causes the calling line to be extended from the line link network 102 to the junctor 107. This enables the junctor sensors to detect the condition of the calling loop and by comparing the state of the loop with the previous state thereof stored in the junctor memory 203 associated with the supervisory processing circuit 201, an indication of the open condition of the line circuit can be inserted into the junctor memory 203 and control can be effected via the register control 206, DTA and outpulser circuit 208 and junctor control 211 to apply dial tone through the service link network 111 and junctor 107 back to the calling subscriber.

The calling subscriber now dials and the supervisory processing circuit 201 connected to the sensors in the junctor 107 builds up the impulses and digits received and signals these to the register buffer 205. The register buffer has a means of storing the address of the junctor 107 which is transferring information at a given time. The buffer 205 therefore receives not only impulse information or instruction but also the junctor address so that upon comparison of the junctor address stored in a given segment of the register memory 207 with the address stored in the register buffer 205 through the register control 206, a transfer of the information in the register buffer through the register control 206 to the register memory 207 will be effected at the time when access is available to the segment in the memory to which the information is to be applied. The register control is arranged to scan the register buffer at regular intervals, and each time the register buffer 205 is checked against a given register memory segment, a check is made for the presence of the junctor address, which was stored when the register was first allotted to the connection, and if such an address identical to the memory segment is encountered, then the instruction character in the register buffer is transferred to the register control 206 and the register memory 207. In this way, the dialing pattern is processed by the supervisory processing circuit 201, analyzing on and off hook signals by measuring intervals in order to determine change of impulse and detect digits.

At any time that the change in condition of the line circuit is detected via the junctor sensors by the supervisory processing circuit 201 counting is initiated by a counter in the junctor memory 203 in character B thereof, bits 1, 2 and 3 to provide a means of monitoring and recording the time intervals between impulses and after control functions have been performed, such as application of dial tone to a calling line, and also to determine an end of digit condition. Whenever an impulse or an end of digit is recognized, then this information is transferred to the register control 206 together with the address of the junctor from which the information was received. When the register control has received a digit, reference is made to a translator 105 which determines whether the destination of the call is local or whether an outgoing trunk is required. The number translator 105 also provides indication as to whether or not the digit or digits received are sufficient to require further operations or whether or not additional digits will be necessary before further control will be required.

When the last digit of a local number has been received, control circuitry is utilized to determine whether the called line is busy or free. If it is found busy, the register control 206 with the dial tone applicator and outpulser 208 mark forward through the service link network, the calling junctor 107, and the trunk line network 108 to an available busy tone trunk 112. The calling line is then extended through the junctor 107 and the trunk link network 108 to the busy tone trunk 112 to return busy tone to the calling subscriber. At that time, the service link network 111, the dial tone applicator and outpulser 208 and register control 206 are released for use in connection with another call.

If a called number is found to be free after the last digit is received, the register control 206 effects connection of the ring control 210 through the service link network 111, the calling junctor 107, and the trunk link network 108 to the called subscriber equipment. The ringing code and class of service, if any, of the called subscriber are obtained from the register control via the number translator 105. At this point, the register control 206 and the dial tone applicator and outpulser 208 may be released. A metallic path has now been established from the ringing control 210 via the cross points of the service link network 111, the junctor 107, the trunk link network 108, the line link network 102 to the called line, ringing is applied over this path to signal the called station and ring back is applied to the calling subscriber. When the called party answers the ringing is tripped, the transmission circuit is extended through the junctor 107 from the calling line to the called line, and the service link network 111 and ringing control 210 are released. The called line sensor in the junctor 107 is now connected to the called line, except in metallic switch-through operations, and thus the supervisory processing circuit 201 can keep account of the state of both the called line loop and the calling line loop. The supervisory processing circuit now checks for flash or release from either the calling or called line; the flash in conjunction with the proper class of service of the flashing party as determined by the information stored in character E of the segment associated with the junctor 107 in the junctor memory 203 will permit connection of the junctor 107 via the service link network 111 to appropriate control circuits of trunks such as the malicious call trunk, in a manner to be described in detail hereinafter.

With the supervisory processing circuit 204 continuously monitoring the condition of the calling and called line circuits, the opening of either of these line circuits indicating an "on hook" condition by either subscriber will be detected in the supervisory processing circuit which will then acquire the SLN control 110 and service link network 111 once again. When the opening of the calling line circuit is detected through the junctor 107 by the supervisory processing circuit 201, the SLN control 110 initiates the release sequence by the connection of the junctor release control 209 through the service link network to the junctor 207 thereby freeing the junctor and the remaining service equipment in a manner to be described in greater detail hereinafter.

THE JUNCTOR CIRCUIT

The junctor circuit provides both sensors for detecting the condition of the calling and called line circuits and suitable controls for connecting via the service link network 111 the various common circuits which are necessary to effect service control for the system. This junctor additionally serves as both an originating and a terminating junctor incorporating a transformer bridge having a saturated inductor sensor in both the calling and called sides. The junctor circuit is arranged so that it has no inherent decision-making circuitry but is a slave to a processing control derived from the supervisory processing circuit and the register control. A schematic circuit diagram of the junctor circuit is illustrated in FIGS. 3A and 3B.

The main voice transmission path through the junctor is by way of the tip T and ring R leads from the line link network through the transformer bridge 301 to the trunk link network 108. A calling bridge CB in the form of a saturable transformer has its input windings connected on either side of a DC isolation capacitor 302 in the calling side of the transmission bridge 301 with the opposite ends of the input winding connected to ground and negative DC respectively. Thus, upon closing of the calling line circuit, a DC path is completed from ground through the input windings of the calling bridge CB to negative DC voltage saturating the core of the transformer. Similarly, with an open condition of the line circuit, the path through the input windings of the calling bridge CB will be open and the core will remain unsaturated.

An answering bridge AB is provided on the called side of the transmission bridge 301 with its input windings connected on either side of the DC isolation capacitor 303 between ground potential and negative DC through the registors 304 and 305, respectively. As in the calling bridge CB, a closed line circuit to the called subscriber will provide a closed path from ground through the input windings of the answering bridge AB to negative DC voltage saturating the core of the bridge while an open line circuit will provide no such complete path through the input windings, leaving the saturable core of the bridge in an unsaturated condition.

The condition of the calling and called line circuits connected to the junctor are monitored through an application of an interrogate or read pulse through the read windings of the calling bridge CB and answering bridge AB, which windings are connected in series through leads 310 and 311 to the electronic scanner 202, which pulses these windings every 10 milliseconds to determine the condition thereof. If the calling or called line circuits are open, an output pulse will be generated in the output windings and applied to the junctor supervisory processing circuit 201 via leads 314 and 315 from the calling bridge or via leads 316 and 317 from the answering bridge, as the case may be. However, if a line circuit is closed indicating an "off hook" condition, the core of the bridge associated with this line circuit will become saturated due to the closed circuit through the input windings of the bridge, and so application of an interrogate or read pulse to the input windings of the bridge will result in no signal output from the read out windings thereof. Thus, the condition of the line circuits is determined by the presence or absence of an output from the read out windings of the calling bridge and answering bridge in response to continuous scanning or pulsing thereof.

The service link network 111 has five output leads T, R, S, MK and CO over which the various control signals for effecting the functions associated with the junctor are transmitted. There are six main relays in the control portion of the junctor circuit, each providing a function or functions in response to control transmitted through the service link network 111. The change-over relay CO is a bipolar relay which permits double use of the control leads T, R, and MK thereby making it possible to apply different control signals from the service link network to the junctor in a number in excess of the individual leads which interconnect these circuit elements. The change-over relay CO also provides a means for isolating the control leads T and R from the transmission lines T and R during control functions so as to prevent noise transmission along these transmission circuits.

The relay RD which is connected through the control line T to the service link network as a means for placing a holding ground on the sleeve lead S back to the line link network and also connects the link link network to the calling side of the transmission bridge 301 so as to make possible a monitoring of this line by the supervisory processing circuit detecting sensors in the junctor. The relay SR which is connected through the control line MK to the service link network provides for a reversal of battery to the calling line circuit upon detection of an "off hook" condition at the called subscriber end of the system.

The relay RT connected to the control line CO to the service link network provides a holding ground forward toward the trunk link network on the sleeve lead S and also connects the line circuit of the called party to the transmission link 301 in the junctor so that a monitoring of the condition of this line circuit by the supervisory processing circuit through detection of sensors in the junctor can be effected. The relay RT shares this line with the change-over relay CO and operates in conjunction with this relay such that depending upon the polarity of the signal applied to the control lead it is possible to either operate the changeover relay CO and the relay RT simultaneously or to effect operation of the change-over relay CO and release of the relay RT.

Each of the relays in the junctor is a latching relay with the exception of the relay CO, which is a bipolar relay and each of these latcing relays is set by a positive pulse and reset by a negative pulse. Thus, application of a negative pulse on the control lead CO will set the change-over relay CO via the rectifier 320, however, the RT relay will remain reset due to the polarity of this pulse. Once the relay CO has been set, a positive pulse can be applied to the lead CO which will pass through the rectifier 321 in view of the previously set condition of the relay CO and retain this setting of the bipolar relay, however, due to the polarity of this pulse it will also set the relay RT at this time. On the other hand, if the change-over relay CO is in the reset condition and a positive pulse is applied to the control line CO, the relay RT will first be set and then the relay CO will be set via the rectifier 321. In this way, it is possible depending upon the polarity of the control signal applied to the line CO to set only the relay CO, set both the relay CO and the relay RT, and set the relay RT and then the relay CO in consecutive order. Since the latter operation is substantially instantaneous, it is seen that the relay CO can be set at any time with either a positive or a negative pulse applied to the controlling line CO.

The relay TK connected to the control line R to the service link network provides a means of extending a dry loop toward the trunk link network thereby obviating the need for a trunk circuit when the outgoing trunks are dialable trunks. This is effected by connecting across the capacitor 303 on the called side of the transmission bridge 301 in the junctor by way of the lead 322 and the diodes 323 and 324. This effectively removes DC from the called side of the transmission bridge 301.

The relay CN provides a means of switching through metallically when the call is either to an outgoing trunk or from an ingoing trunk. This relay operates in conjunction with the relay TK, and like relay CO is a bipolar relay. When the relay TK is set, ground is applied to the relay CN via the unoperated contact of RD setting the relay via line 325. This connects the line 326 to the sleeve lead S which maintains a holding ground on the relay CN during the switch-through process.

The junctor also incorporates a winding 330 on the transmission bridge 301, which winding is connected via the control lead MK to the service link network and serves as a means of feeding dial tone or ring back tone toward the calling line on a transformer induced basis.

A relay SL is provided as a special feature of the junctor circuit and serves as a stuck relay control which is activated at the time the junctor is free from a transmission circuit and whenever one of the relays of the junctor remains in the set condition and thereby prevents further access to this junctor until it is determined whether or not the condition is due to a control function or whether it is due to a misfunction of one of the relays in the junctor circuit.

The transmission line MK from the line link network into the junctor is marked when the junctor is connected to the line link network thereby indicating the busy condition or free condition of the junctor, as the case may be.

JUNCTOR RELAY CONTROL

The junctor relay control illustrated in detail in FIG. 4 is utilized in combination with the dial tone applicator and out pulser circuit 208 to control the junctor relays during the initial stages of setting up a call and also controls the junctor circuit in response to the register processer 106 and supervisory processing circuit 201 to set up the necessary switching combination in the junctor circuit for effecting operations during a call and upon termination thereof. There are preferably two junctor relay control circuits provided in the system for the plurality of dial tone applicator and out pulser circuits 208, which make use of the two junctor relay controls on a time share basis. Of course, additional junctor relay control circuits, or only one circuit, may be provided without departing from the spirit and scope of the invention in accordance with the requirements of the overall system.

As indicated above, as soon as an open line circuit is detected and the condition signalled to the line link network control 104, a sequence of events is initiated under control of the common register processer 106 which results in the application of dial tone to the line circuit of the calling party. This sequence of events is programmed in the common register processer 106 which supplies the control signals, in the proper timed sequence via the junctor relay control 211 and dial tone applicator and out pulser circuit 208 through the service link 111 to the proper relays in the junctor 107 for effecting this operation. The junctor relay control signals are applied from the common register processer 106 to the junctor relay control 211 at input AND gates 400 through 407, as seen in the detailed circuit diagram of FIG. 4. The input control signals include CO positive and negative (COP and CON) signals, T positive and negative (TP and TN) signals, R positive and negative (RP and RN signals), S positive (SP) and MK negative (MKN signals). The manner in which these control signals are utilized to effect actuation of the proper relays in the junctor 107 to perform the desired functions will be described in greater detail hereinafter in connection with the description of the dial tone applicator and outpulser circuit 208.

The AND gates 400 through 407 are enabled by the output signal from AND gate 408 which is controlled by a set signal SET and a signal BF from the programmer in the common register processer 106. The signal BF for enabling the AND gate 408 may also be derived from the output of AND gate 409 as will be described in greater detail hereinafter. The control signals from the register processer 106 are applied through the enabled input AND gates 400 through 407 to respective input flip flops 411 through 418, which are set by application of the control signals thereto. The outputs of flip flops 413 through 418 are applied to AND gates 423 through 428, respectively, which in turn place these control signals on the lines T, R, S, CO, HLD and MK, respectively, to the associated dial tone applicator and out pulser circuit 208 to which the junctor relay control circuit is connected.

The enabling of the AND gates 423 through 428 so as to permit the control signals from the common register processer 106 to pass through to the dial tone applicator and out pulser circuit is effected under a time sequence controlled by a binary counter 421 which is started through application of a start signal PL upon coincidence of a timing pulse from a 200 pulse per second source and either of the signals COP or CON applied via respective flip flops 411 and 412 through OR gate 419 to AND gate 420. The timed order of operation provided by the binary counter 421 is necessary to insure that prior to application of control pulses from the junctor relay control through the dial tone applicator and out pulser circuit and service link network to the junctor, the relay CO in the junctor is set by either a control signal COP or CON from the common register processer 106 so that initially the tip T and ring R transmission lines in the junctor to the trunk link network are isolated from the corresponding T and R control lines connected to the service link network, thereby preventing feedback of control impulses from the relays to the transmission line.

Thus, as soon as the control signal COP or CON is applied to its respective AND gate 400 or 401, this control signal is immediately applied to the line CO to the dial tone applicator and out pulser circuit (FIG. 5A) to set the relay CO in the junctor via the service link network and also, at the same time, is applied through OR gate 419 to AND gate 420, whereupon coincidence with a pulse from the pulse source connected to the AND gate applies the start signal PL to the binary counter 421. The binary counter 421 then begins its binary count until it reaches a count of six (0110) which enables the AND gate 422 applying a start signal to the flip flop 410. With the setting of flip flop 410, the AND gates 423 through 428 are enabled in coincidence with the control signals applied via flip flops 413 through 418 and the control signals are then applied to the appropriate lines to the dial tone applicator and out pulser circuit.

At the same time, the zero output from each of the flip flops 410 through 418 is applied to AND gate 431, which monitors the set condition of each of the flip flops 410 through 418, which signal is represented by an output to AND gates 432 and 430. The AND gate 432 also receives a signal from AND gate 433 connected to the reset or "not" outputs of the binary counter indicating the operating condition of the binary counter. The output of AND gate 432 represented by the signal BF therefore indicates the busy condition of the junctor relay control. This signal BF is utilized during the initial selection of a free junctor relay control to be associated with the dial tone applicator and out pulser circuit as will be described in more detail hereinafter.

The binary counter 421 continues its binary count until it reaches a count of 12 (1100) at which time the AND gate 429 is enabled providing an output signal which resets each of the flip flops 410 through 418. The reset condition of the flip flops is then detected by AND gate 431 providing an output signal to AND gate 430 in coincidence with the output of AND gate 429 which resets the binary counter. This reset condition of the counter in the flip flops is also monitored at AND gate 432 which then indicates the free condition of the junctor relay control and enables its use immediately in conjunction with another dial tone applicator and out pulser circuit.

DIAL TONE APPLICATOR AND OUTPULSER

The dial tone applicator and out pulser circuit may be divided into a mechanical portion, as illustrated in FIG. 5A and an electronic portion as illustrated in FIG. 5B. The mechanical portion contains the various relays which connect the output control lines from the junctor relay control 211 through the service link network 111 to the junctor 107. In response to control signals applied through the electronic portion of the dial tone applicator and out pulser from the common register processer 106.

Looking to FIG. 5A, the input control lines T, R, S,

CO, HLD, and MK are provided in duplicate for connection to the two respective junctor relay control circuits available to the plurality of dial tone applicator and out pulser circuits in the system. The two sets of input control leads in the mechanical portion of the dial tone applicator and outpulser circuit are suffixed either with a designation (A) or a designation (B) depending upon whether they are connected to the A junctor relay control or the B junctor relay control. The outputs BF from each of the junctor relay controls A and B are applied to the electronic portion of the dial tone applicator and outpulser in FIG. 5B to respective AND gates 500 and 501.

As indicated above, at the time a dial tone applicator and outpulser circuit and a junctor circuit is elected by the common register processer 106 for processing a given call, the address of the associated junctor is stored in the register memory 207 which is periodically scanned to provide access between the various portions of the memory and the common equipment on a time share basis. When the address of an associated junctor and dial tone applicator and outpulser circuit is detected by a register cell address scanner (not shown) in the common register processer 106, AND gates 502 in the electronic portion of the dial tone applicator, and outpulser circuit (FIG. *5B*) is enabled, thereby applying an enabling signal to the AND gates 500 and 501. If at this time the junctor relay control A is free for connection to the dial tone applicator and outpulser circuit, coincidence will occur at AND gate 500 enabling this AND gate and applying a signal BFA to the register common processing circuit which in turn will apply the signal BF in coincidence with a SET signal to AND gate 408 in the junctor relay control enabling the input AND gates 400 through 407 therein. If, on the other hand, the junctor relay control A is occupied at the time that the associated register cell in the register memory 207 is being scanned, and if the junctor relay control B is free for connection to the dial tone applicator and outpulser circuit, coincidence will occur at AND gate 501 which provides a signal BFB to the register processer so that the input AND gates in the junctor relay control control B may be enabled. If both the junctor relay controls A and B are in use at the time of scan of the associated register cell, no connection will be effected between the dial tone applicator and outpulser circuit and a junctor relay control until the next scan of the associated cell when one of the junctor control circuits is available. This process will continue until a junctor relay control is available to the dial tone applicator and outpulser circuit.

Upon connection of a junctor relay control to a dial tone applicator and outpulser circuit and application of an input pulse COP or CON to the junctor relay control sufficient to enable OR gate 419, an output pulse will be applied to the control line HLD from the junctor relay control to the electromechanical portion of the dial tone applicator and outpulser circuit enabling either the relay RCA or the relay RCBB, depending upon which of the two junctor relay controls A or B is selected, in coincidence with setting of the associated flip flops 503 or 504 on the electronic portion of the dial tone applicator and outpulser circuit by the common register processor 106.

The flip flops 503 and 504 are set by way of AND gates 505 and 506, which are enabled by coincident signals from address AND gate 502, a respective signal RCA or RCB from the register processor 106 and reset signals from flop flop 510 associated with the dial tone circuit and the flip flop associated with the other AND gate, either 503 or 504. In this way, the relay RCA; for example, is set only if the junctor relay control A is available, if the signal RCA from the register processor 106 is applied to AND gate 506, if the flip flop 503 associated with the junctor relay control circuit B is reset, and if no dial tone has been applied to the output control leads from the dial tone applicator and outpulser circuit. The relays RCA and RCB serve to activate one or the other of the two sets of input control leads into the electromechanical portion of the dial tone applicator and outpulser circuit as is evident from FIG. 5A.

The remaining inputs into the electromechanical portion of the dial tone applicator and outpulser circuit are the dial tone leads DT and DTG connected to a dial tone generator of conventional configuration. The dial tone lead DT is connected to the output control line MFK to the service link network 111 and the junctor 107 upon actuation of the dial tone relay DT in the electromechanical portion of the dial tone applicator and outpulser circuit (FIG. *5a*) which relay is activated in accordance with a timed sequence by the programmer in the common register processer 106 via line DT to AND gate 511. The AND gate 511 is enabled by coincidence of the control signal DT from the processer with the output of AND gate 502 connected to the register cell address scanner in the processer.

A relay RD is provided in the electromechanical portion of the dial tone applicator and outpulser circuit which is energized upon application of control pulse RD from the register processer 106 to AND gate 512 which sets flip flop 508 upon coincidence with the output signal from AND gate 502 connected to the register cell address scanner. The energization of relay RD serves to place a ground on output control line S through the service link network to the junctor which enables the marking from the junctor back to the line link network. A relay SR is provided in the electromechanical portion of the dial tone applicator and outpulser circuit in series with the control line R and serves to effect a monitoring of the reversal of battery on the colled side of the transmission bridge in the junctor under control of the register processor 106. Energization of the relay SR upon application of the proper pulse to the line R from the junctor relay control places a ground on the lead SR to the electronic portion of the dial tone applicator and outpulser (FIG. *5B*) which is applied to AND gate 513, enabled by the output of AND gate 502 connected to the register cell address scanner. The condition of the called side of the transmission line is then applied to the register processor via the AND gate 513 which condition is determined by whether or not the polarity of the called side of the transmission line will energize or not energize the relay SR and therefore apply a ground to AND gate 513. A relay SH is also provided in the electromechanical portion of the dial tone applicator and outpulser, which when energized through application of a control pulse SH through AND gate 514 in coincidence with the output of AND gate 502 to flip flop 509 serves to shunt the relay SR, preventing operation of this relay and providing a low impedance path for outpulsing.

When it is determined by the number translator 105 after receipt of dialed information from the calling subscriber that an outgoing trunk circuit to other common control equipment must be effected, it is necessary to transfer the dialed information stored in the register memory 207 through the service link network 111 and junctor 107 to this outgoing trunk circuit for storage and further processing in the other common control equipment. This function is carried out by the outpulser section of the dial tone applicator and outpulser circuit. Outpulsing is effected through a relay PL controlled by application of control pulses PL through AND gate 515 to flip flop 507 in coincidence with the output of AND gate 502 from the register cell address scanner. Energization of the relay PL provides a direct connection 516 between the output control lines T and R in the electromechanical portion of the dial tone applicator and outpulser circuit, thereby providing an outpulsing through the service link network 111 and junctor 107 to the outgoing trunk circuit. This outpulsing is carried on under control of the register processor 106 in accordance with the information stored in the register memory 207.

An AND gate 517 in the electronic portion of the dial tone applicator and outpulser circuit (FIG. 5B) is connected to the register processer 106 and is energized by detection therein of the address of the preceding register cell stored in the register memory 207 to the cell which is associated with the particular dial tone applicator and outpulser circuit, and this AND gate 517 serves to reset the flip flops 503, 504, 507, 508, 509 and 510, thereby insuring that no incorrect information is stored in the flip flop just prior to scanning of the register cell in the register memory 207 which contains information for the dial tone applicator and outpulser circuit. Upon scanning of the appropriate cell in the memory, the electronic portion of the dial tone applicator and outpulser circuit is ready for receipt of information.

A relay BY in the electromechanical portion of the dial tone applicator and outpulser circuit is provided as part of the general alarm circuit providing monitoring of the condition of the various relays in the system and prevents use of the equipment upon detection of an improper condition of any of the relays PL, RD, SH and DT which are of the latching type in the electromechanical portion of the circuit. If at a time of inactivity of the circuit, any of the relays remain operated, the relay BY will be energized applying a signal ALM through AND gate 518 in coincidence with the output of AND gate 502 from the register cell address scanner to the register processor 106, when the circuit is first scanned by a register, thereby preventing the application of control information and instruction to this circuit.

In order to provide a clearer understanding of the functions of the junctor relay control and dial tone applicator and outpulser circuit the following description of the operation of these circuits from detection to an open line circuit of a calling subscriber to the application of dial tones to this line circuit will now be set forth.

At the time a call is originated, the open line resulting from an off-hook condition is detected by the line scanner 103 which signals this condition to the line link network control 104. The line link network control scans the junctors and the dial tone applicator and outpulser circuits to find an available one of each as determined by the condition of the MK circuit in both the junctor and the dial tone applicator and outpulser circuits. When a free dial tone applicator and junctor are selected, the address of the junctor is stored in the dial tone applicator and outpulser portion of the register memory 207, which has a portion or cell allocated for each dial tone applicator and outpulser circuit for which it is available.

The programmer in the common register processor 106 then initiates a timed sequence of events which eventually results in the application of dial tone back through the dial tone applicator and outpulser circuit, the service link network 111, the junctor 107, and the line link network 102 to the calling line circuit 101. This sequence of events begins by application of a control signal RD through the AND gate 512 in coincidence with the output of AND gate 502 from the register cell address scanner to set flip flop 508 in the dial tone applicator and outpulser circuit, (FIG. 5B). Upon setting of the flip flop 508, the relay RD in the electromechanical portion of the dial tone applicator and outpulser circuit is energized and places ground on control line S through the service link network to the junctor 107 where it is applied to the transmission line S back to the line link network establishing connection between the line link network and the junctor in accordance with a typical marking operation through a finder sequence. However, since the relay RD in the junctor is not as yet operated, the change in condition of the calling line due to the off-hook condition cannot as yet be detected by the sensors in the junctor.

At this point, it is necessary to operate the relay CO in the junctor to connect the output control leads from the junctor to the junctor relays and isolate the transmission lines on the called side of the transmission bridge in the junctor from the junctor relay control circuit and the dial tone applicator and outpulser circuit for the following sequence of operations. This is effected through application of negative signal CON from the programmer in the register processor 106 to AND gate 401 and the junctor relay control, which, as indicated above, sets flip flop 412 providing the proper output control signal to the line CO in the junctor relay control from which it is applied through the line CO in the dial tone applicator and outpulser circuit (FIG. 5A) through the service link network 111 to the control line CO in the junctor 107 to set the relay CO.

At the same time, the setting of the flip flop 412 enables OR gate 419 in the junctor relay control which subsequently enables AND gate 420 upon coincidence of the next pulse from the 200 pulse per second pulse source to start binary counter 421. When a count of binary 6 is reached by the binary counter AND gate 422 is enabled setting flip flop 410 which enables each of the AND gates 423 through 428 in the junctor relay control providing application of the control signals applied to the input AND gates 402 through 407 from the common register processor 106 through the dial tone applicator and outpulser circuit and the service link network 111 to the junctor 107. During this period when the AND gates 423 through 428 are enabled in the junctor relay control a control signal is applied to each of the output controls lines T, R, S, CO and MK through the dial tone applicator and outpulser circuit to the junctor 107 to insure that the relays in the junctors are set properly for the following operation. Under control of the common register processor 106 a positive signal is applied through AND gate 402, flip flop 413 and AND gate 423 to line T in the junctor actuating relay RD thereby connecting the calling bridge CB to the transmission lines T and R from the line link network. Negative signals are applied to the output control lines R and MK of the junctor relay control to the corresponding lines in the junctor to relays TK and SR to insure that these relays remain in the reset condition. Actuation of the relay RD in the junctor in addition to connecting the calling bridge CB to the line link network also places a ground on the transmission line S to the line link network so that the ground applied to this transmission line from the dial tone applicator and outpulser circuit through energization of the relay RD therein can be removed at the end of the scan of the address cell in the register memory 207 without disconnection of the junctor from the line link network.

Under control of the common register processor 106 in accordance with the timed sequence the signals on line T, R, and MK in the junctor are first removed and then the output signal on lead CO in the junctor is removed to deactivate the relay CO. Since the relays RD, TK and SR are latching relays, the previous condition of the relays will be maintained even after the signals are removed; however, since the relay CO is a polar relay, this relay is deactivated by removal of its control signal.

The program in the register processor 106 then provides for application of control signal DT to the dial tone applicator and outpulser to enable AND gate 511 and set flip flop 510 thereby energizing the relay DT in the circuit. As soon as the relay DT is energized, the dial tone generator is connected via the line DT to the output control line MKF from the dial tone applicator and outpulser circuit connecting the dial tone generator to line MK in the junctor, which due to the condition of relays CO and TK, is connected to the winding 330 of the main transmission bridge 301 in the junctor inducing dial tone in the calling side of the bridge to be applied back through the line link network to the line circuit of the calling party.

With dial tone now applied through the junctor to the calling party and with the condition of the calling line being monitored by the sensors in the junctor, which are connected to the supervisory processing circuit 201, further control of the call is vested in the supervisory processing circuit under command from the common register processor 106.

SUPERVISORY PROCESSING CIRCUIT

FIG. 6A shows a general arrangement of the supervisory processing circuit 201 which is time divided over a number of junctors so as to provide control for a plurality of calls at a given time. The time division is accomplished by a scanner circuit 202 which pulses into the calling and called sensors of each junctor in turn, which sensors are provided in conjunction with a saturated inductor so that whenever the calling or called loop is open an inductive coupling exists between the windings of the sensor and hence, an output pulse occurs. When, however, current flows in either the calling or called loops then the transformer is saturated and no coupling exists so that there is no output pulse derived therefrom. In this way, it is possible to build up a logic pattern of open and closed states on the sensor and thus detect impulses derived from the calling line. Since the scanner examines each junctor at regular intervals, it is possible to relate the state of the loop and the time of scanning with the record of the previous state of the loop, maintained in the junctor memory 203, which is available at each examination of the condition of the line to which the junctor is connected. This detection of line condition change plus existing line condition serves as means for initiating control functions via the common register processor 106.

Referring now to FIG. 6A, there is provided a schematic diagram of the switching arrangement between the supervisory processing circuit 201, the junctor memory 203, anid the plurality of juctors 107 associated with these elements by means of the electronic scanner 202. The scanner 202 may comprise a chain counter or any other well known device for sequentially pulsing the interrogate windings in both the calling and called bridges of each of the junctors 107. This sequential scanning of the interrogate windings in the junctors 107, which may be carried out through use of a conventional scanner matrix in conjunction with a series counter arrangement, is effected in synchronism with a sweeping of the junctor memory 203 so that as each given cell associated with a given junctor is acquired in the junctor memory 203, a coordinate acquisition and connection of the junctor to the supervisory processing circuit 201 is effected under control of the electronic scanner 202. The scanner is operated under control of a suitable clock signal and reset signal which are applied to the supervisory processing circuit 201 to effect coordinate control thereof. As will be indicated in greater detail hereinafter, the supervisory processing circuit 201 accepts information from the individual junctors scanned by the electrode scanner 202 and compares this information with the information in the junctor memory as to the previous condition of the line circuits connected to the junctor and this information along with data from the common register processors is used to update the junctor memory and also effect control of the various common circuits either through the service link network control 110 and service link network 111 or through the register buffer 205 and register control 206.

Referring now to FIG. 6B, which shows a schematic diagram of the supervisory processing circuit 201 with only one pair of calling and called sensors illustrated in the diagram so as to avoid the complication caused by illustration of duplicate equipment, it should be understood from the above mentioned description of FIG. 2A that the sensors in the junctor are sequentially connected to the supervisory processing equipment so that at any given time only one pair of sensors from a single junctor will be connected to the circuit. FIG. 6B schematically illustrates such a condition.

The read out windings 600 of the calling sensor and the read out winding 601 of the called sensor are connected respectively to flip flops 602 and 603, which devices are set by application of a pulse from the read out winding, but remain in the reset condition if due to the saturation of the core in the calling or called bridge no pulse is provided by the read out winding upon interrogation of the calling and called sensors. Thus, the set or reset condition of the flip flop 602 and 603 determine the condition or state of the calling and called line circuits, respectively. The clock pulses applied to the electronic scanner 202 serve to interrogate the sensors in each junctor once every 10 milliseconds so that a dialed impulse which is 20 milliseconds in length will be sensed at least twice during its duration by the supervisory processing circuit thereby insuring that the loop is closed or opened for a definite period of time before the condition is recognized as a distinct signal and not a bouncing contact.

The supervisory processing circuit includes a series of twenty-five AND gates 604 through 629 which individually receive a respective one of the twenty-five bits of information stored in the junctor memory 203 associated with the particular junctor which at that time is being scanned and apply these bits of information to a series of flip flops 630 through 655 upon coincidence at the AND gates 604–629 of a timing pulse from READ flip flop 656. The bits of information stored in the information flip flops 630–655 are applied to a data control network 660 which consists of an AND gate arrangement for combining the information provided in the junctor memory 203 with the updated information provided by the sensors in the junctor and data provided from the register processor 106. For example, during examination of the sensors in a given junctor, the twenty-five bits of data in the junctor memory associated with this junctor are applied to the data control network 660 via the AND gates 604–629 and flip flops 630–655. At the same time, any change in data present in the junctor memory and available through the register processor is also applied to the data control network. The AND gate arrangement in the data control network then provides a logical comparison between the previously stored data and the updated information provided from the junctor and the register processor and rewrites this information to provide a more correct representation of present conditions in the system.

Referring temporarily once again to FIG. 2B, the information in the character A, bits 3 and 4 representing the condition of the calling and called line circuits, respectively, from the memory would be compared with the data stored in flip flop 602 and 603 and detected changes in this condition would then be written into the memory at these locations by suitable AND gates. In addition, information for example in character A, bits 1 and 2, providing for a condition of the system, and data for example in characters C, D and E which represent subscriber information provided by the translator via the processor, and also represent conditions in the system, would be supplied by the register processor to the data control network where it is compared with the data already written into the junctor memory so that a logical ANDing of the data will provide an updating of the information in the junctor memory. In character B, bits 1, 2 and 3 represent a counting sequence provided by the register processor so that during each scan the progress of the counter is applied to the data control network where it is then written into the junctor memory. The result of the logical ANDing of the information provided from the junctor and the register processor with the data supplied from the junctor memory is applied through suitable outputs through AND gates 661–685 back to the junctor memory. The AND gates 661–685 are enabled by an output from WRITE flip flop 686 which is set as soon as all of the information applied to the data control network 660 has been processed by that network.

Due to the complexity of the logical arrangement of the AND gates and the data control network resulting necessarily from the combination of a multiple of twenty-five AND gates for insuring correct processing of the applied information, a detailed illustration of the data control network has not been provided. However, it should be sufficient for an understanding of the invention that the data control network 660 provides for a logical combination of the individual bits of information stored in the junctor memory with updated bits of similar information provided by the junctor and the register processor so as to correct or revise the information in the memory during each scan thereof.

Since certain data appearing in the junctor memory in addition to the data indicating the condition of the calling and called loops serve as means for initiating operation of various circuits in the system, the data resulting from the logical combination of information from the junctor, the register processor 106 and previously stored information in the memory is not only written back into the memory, but appropriate bits of information are also transferred via the register buffer 205 to the register control 206 in the register processor 106. The register control 206 stores this information in the register memory 207 and also utilizes this information to control the various common circuits required for a particular function. This output data is also applied from the data control network 660 directly through the service link network control 110 to the service link network 111 where it may act directly upon certain of the common circuits associated therewith.

Looking once again to the operation of the system in conjunction with the supervisory processing circuit, with dial tone having been applied from the dial tone applicator and out pulser circuit 208 under control of the register control 206 through the service link network 111, junctor 107 and line link network 102 to the line circuit 101, any change in the condition of the calling line circuit will be detected by the supervisory processing circuit, which scans the calling sensor in the junctor connected to the line circuit every 10 milliseconds. When the calling party begins dialing, the change in condition of the line circuit from open to closed is detected and stored in the junctor memory during the next scan of the junctor. In addition, the change in condition of the line circuit causes a change in the condition of the character A, bit 1, of the junctor memory from a zero to a one to indicate the present use of this memory cell. The condition is also applied to the register processor 106 which starts the sequence counter therein provided for timing the intervals between detected pulses in the line circuit.

During each successive scan of the junctor memory at five millisecond intervals, the bits 1, 2 and 3 in character B of the memory are stepped by the counter in the register processor 106 to provide a count of the time interval subsequent to the receipt of the change of line condition. This timing is continued until it is determined whether the change in line condition is the result of a dialing impulse or whether or not the calling subscriber has hung up, as indicated by the expiration of a predetermined period of time resulting in a predetermined count in the memory. In case of the latter situation, the connection to the line circuit is terminated unless a particular class of service prevents this, and the time share equipment is disassociated from the junctor and supervisory processing circuit.

In the case of a dialing condition a dialing pulse indicated by an open circuit will be detected in the supervisory processing circuit which writes the information into the memory during the next scan and the counter in the common register processor 106 is reset and begins its count once again, the count being inserted during each scan into character B in the junctor memory. As indicated previously, at least two scans of the junctor sensors occur during each dialing impulse so as to insure that the change of line condition is a dialing impulse rather than a bouncing contact.

After the dialing impulse has been detected twice in the supervisory processing circuit, bit 1 of the character D of the junctor memory is changed from a zero to a one indicating that the register buffer 205 should be requested. This instruction stored in the memory is also applied to the register buffer and the instruction in character D of the memory is repeated until the buffer which is provided on a time share basis is available for association with the supervisory processing circuit. After the buffer is seized and during the next cycle, the dialing impulse is transferred to the buffer where it will be shifted to register control 206 and register memory 207. As a result of receipt of a dialing impulse, which has now been transferred to the register control 206, it is necessary to remove dial tone from the line circuit of the calling party, which function is performed by the dial tone applicator and out pulser circuit under control of the common register processor 106. At the same time, the counter in the junctor memory continues its count to determine the interpulse interval.

The supervisory processing circuit may next detect a closed condition in the junctor sensor indicating a dialing impulse, which again is stored in the register memory and serves to reset the counter in the memory to measure the interpulse interval. This counting subsequent to the detection of a dialing impulse will continue either until a next impulse is detected or until a 40 millisecond time period has expired as indicated by a control signal from the register processor 106. When the 40 millisecond pulse is received from the processor an end of digit sequence is initiated.

If additional dialing impulses are recived from the supervisory processing circuit from the junctor 107, in each case the impulse detected is stored in the junctor memory and applied through the register buffer 205 to the register control 206 and register memory 207 along with resetting of the counter and the junctor memory to determine the interpulse interval. When the last impulse of a digit has been received, the counter in the junctor memory will continue its count until the first 40 millisecond pulse is received from the register processor 106, the counter having reached a binary count of 100 at this time, the counter is then stopped and retains its binary count until the next 40 millisecond pulse is received from the register processor 106 at which time the counter shifts to binary 101. The counter retains its binary count until a third 40 millisecond pulse is received from the register processor which then shifts the counter to a binary 111 indicating an end of digit condition.

During the next scan, the buffer is requested by the supervisory processing circuit, and when received, the end of digit signal previously inserted into the junctor memory, upon receipt of the third 40 millisecond timing pulse is transferred through the buffer to the register control memory indicating that a complete digit has now been stored in the register memory. As soon as information is received in the register processor to indicate that the first digit has been dialed and stored in the register memory, reference is made to the number translator 105. If the destination of the call can be determined at this time from the digit which has been received, the translator supplies this information to the register control 206 which then takes further action to complete the call.

However, if the destination of the call or other required information cannot be supplied at this time, then the register control refers to the translator 105 again after the second digit has been received and repeats this procedure after each digit received until information as to the destination of the call, whether it be a local call or an outgoing call is provided by the number translator. If the call is finally determined to be local, then the register marks the called line circuit through the line link network control and by a conventional marking operation the junctor 107 is connected through the line link network to the called party.

Ringing is then applied to the called line loop provided the line is not busy at the time of connection thereto, and ringing to the called line circuit with the ringback to the calling line circuit is maintained until the called party answers, as indicated by a reversal of battery in the called line loop, or the calling party hangs up, as indicated by a change in the condition of the calling line loop.

JUNCTOR RELEASE CONTROL

The junctor supervisory and release control includes an electronic portion shown in FIG. 7A and an electromechanical portion shown in FIG. 7B. The electronic portion provides for a coincidence between the junctor address and the address associated with stored information in the register control 206 with the instruction from the register control being applied to the electromechanical portion of the junctor release control upon coincidence of the two addresses. The junctor release control provides for release of the junctor, release of the SR relay in the junctor, and operation of the SR relay in the junctor for purposes of terminating a call or for use during switch-through trunk calls and non-switch-through trunk calls. The circuit provides for a busy store flip flop which indicates through application of a controlled output the condition of the junctor release control during attempted acquisition thereof by the supervisory processing circuit.

The "X" and "Y" portion of the junctor address associated with the call requiring the services of the junctor release control is applied via the service link network control 110 and service link network 111 to input address flip flops 1000–1007, which in accordance with the set or reset condition determine the address of the junctor associated therewith. The junctor address stored in the register memory 207 along with appropriate instruction for further processing or control of the system is applied via the service link network control 110 and service link network 111 to input coincidence AND gates 1008–1015 and 1016–1023, to which the set and reset outputs of the flip flops 1000–1007 are also applied.

A coincidence between the two addresses at the coincidence AND gates 1008–1023 enables these AND gates providing a coincidence signal via the OR gates 1024–1031 to control AND gates 1032 and 1033 controlling the "X" and "Y" portions of the address, respectively. The flip flops 1032 and 1033 and the outputs of AND gates 1008–1015 and 1016–1023, respectively, applying the resulting control signals to each of the instruction AND gates 1034–1039. Instruction signal for operation of the SR relay in the junctor is applied to the instruction AND gate 1034, a signal for release of the SR relay in the junctor is applied to AND gate 1035. Signal for release of the junctor is applied to AND gate 1036, a reset signal is applied to AND gate 1037 and alarm signal is applied to AND gate 1038 and an "enable alarm" signal from the alarm circuit is applied to AND gate 1039.

Thus, upon coincidence of the two addresses applied to the junctor release control the instruction AND gates will be enabled by the application of any instruction signal from the register control 206. The output of AND gate 1034 represents an "operate SR" relay signal applied to information flip flop 1040 setting this flip flop to provide an output for control of the electromechanical portion of the junctor release control in FIG. 7B. In a similar way, the release SR relay signal derived from AND gate 1035 and applied to information flip flop 1041 sets the flip flop and applied a control signal to the electromechanical portion of the system. The release junctor signal derived from AND gate 1036 is applied to information AND gate 32 which sets the AND gate and also applies the control signal to the electromechanical portion of the circuit. The output of AND gate 1037 provides a reset signal which is applied to the information flip flop 1042 and to each of the address flip flops 1000–1007 to reset each of these flip flops. In addition, the reset signal is also applied through a pair of OR gates 1043 and 1044 to reset the information flip flops 1040 and 1041. The OR gates 1043 and 1044 are also used to insure proper setting of the information flip flops 1040 and 1041 by providing complementary signals to the reset side of these flip flops to insure their proper setting for each control.

As in the case of the register buffer 205 and the ringing control circuit 210 a busy store flip flop 1045 is provided in the junctor release control circuit to indicate the busy or free condition of the circuit. Each of the impulses in the junctor address provided from the service link network control are also applied via a plurality of OR gates 1046–1053 to AND gate 1054. A bit in both the "X" portion and the "Y" portion of the junctor address received in the junctor release control will provide for enabling of AND gate 1054 to thereby set the flip flop 1045 to provide an output indicative of the busy condition of the junctor release control circuit.

Looking now to the electromechanical portion of the junctor release control in FIG. 7B, there is provided an association with the control signal supplied by the electronic portion of the junctor release control a relay RJT for junctor release, a relay RSR for release of the SR relay in the junctor, and a relay OSR for operation of the SR relay in the junctor. In addition, there is provided control relays OTA and OTB, a control relay ST and a control relay SL. The operation of one of the relays RJT, RSR or OSR in combination with the operation of the various control relays provides the sequence of events which result either in release of the junctor release of the SR relay or operation of the SR relay. The following description of the operation of the electromechanical portion of the system in conjunction with junctor release will further indicate the various functions of the individual components of this circuit.

After the counter in the junctor memory 203 has reached the count which indicates that the junctor control should be attached to the supervisory processing circuit through the service link network control 110 and service link network 111 a release junctor signal REL JCT is obtained through the electronic portion of the junctor release control from the register control 206 actuating the RJT relay in the electromechanical portion of the system (FIG. 7B). The energization of the RJT relay causes energization of the relay SL thereby applying ground through the service link network to the junctor at control line S providing for connection of the junctor release control to the junctor circuit. As soon as the SL relay is energized, ground is applied via the lines 1060, 1061, 1062, 1063 and 1064 to energize the ST relay. Energization of the ST relay applies this same ground to relay OPA energizing that relay which simultaneously applies ground to relay OPB energizing that relay also.

As soon as the SL relay was energized, a negative potential was applied via the resistor 1065 to the control line CO to the junctor, which signal due to its polarity will set the CO relay and reset the relay RT. This disconnects the transmission lines T and R from the transmission bridge 301 in the junctor and also disconnects the control leads T, R, S, MK and CO from the transmission lines to the called line circuit. Then upon energization of the relays ST, OPA, and OPB, a negative potential is applied to the output control lines T, R, and MK so as to release the relays RB and SR in the junctor thereby disconnecting the junctor from the calling line circuit. The CO relay in the junctor is then released and the junctor control circuit is separated from the junctor thereby effecting disconnection of the entire control system from the transmission lines.

The release of the junctor under conditions where the called party terminates the call first is essentially identical to the sequence described above with regard to termination of the calling party first.

MALICIOUS CALL CIRCUIT

In accordance with the invention, a malicious call circuit holding arrangement is associated with the common control system already described so that a called subscriber having a predetermined arrangement for malicious call holding may prevent the release of the calling subscriber line circuit so that this line circuit may be traced even if the calling subscriber replaces his handset. As a result of the malicious call holding arrangement, of the present invention, the tracing of the call through the system which may include enclosed cross point switches is made possible under circumstances which previously would not have permitted such tracing.

As indicated with reference to FIG. 2B, the junctor memory 203 contains a combination of bits in Character C, positions 2 and 3, which indicate that the called subscriber has a record of having received malicious or other annoying telephone calls. This information, which is stored in the number translator 105 along with the class of service and other information relating to the called and calling party, is written into the memory cell of the junctor memory associated with the junctor assigned to the call at the time the call is set up.

Positions 2 and 3 of character C of the memory relate to the release mode for the common control system with the designation (00) indicating a normal release mode wherein release by either the calling or called subscriber serves to terminate the call and the designation (01) indicates that the called subscriber has the malicious call arrangement available. Thus, the called subscriber may release the connection in the normal way by replacing his handset. However, if a call is one that the called subscriber wants traced, then he flashes his handset momentarily and this flashing of the handset in combination with the status of the line circuits and class of service available to the called party recorded in the junctor memory serve to associate the malicious call holding arrangement of the invention with the common control system.

A general arrangement of the common control system previously described in combination with the malicious call holding circuit of the invention is illustrated in FIG. 8. The flashing of the called subscribed handset is detected by the junctor sensors which apply this change of circuit condition to the supervisory processing circuit 201 for storage in character B in the junctor memory 203. The opening of the called subscribed line circuit in combination with the information stored in position 1 of character C of the junctor memory indicating that the subscriber had answered and that a call has been established between calling and called subscribers, provides recognition of the called subscriber flash condition, and this condition in conjunction with the stored information in character C indicating that the called subscriber has been receiving malicious calls, results in the connection of the malicious call circuit 214 in accordance with the invention to the junctor 107 via the service link network 111 under control of the register control 206. As indicated previously in conjunction with the common control arrangement, the above indications of a malicious call arrangement stored in the junctor memory 203 are transmitted by the supervisory processing circuit 201 to the register control 206, which in turn sets the crosspoints in the service link network 111 via the service link network control 110 to effect connection between the malicious call circuit 214 and the junctor 107. In addition, other supervisory control signals are applied from the register control 206 through junctor control 211, and service link network 111 to the junctor 107 for sequential setting and releasing of the junctor relays so that in combination with the malicious call holding circuit of the invention the calling subscriber line circuit is held in spite of efforts to effect the contrary by the calling party, and a tracing tone is applied to the calling line circuit to effect a tracing of the line circuit for purposes of further investigation.

The malicious call circuit in accordance with the invention, as illustrated in FIG. 9, consists of a relay set including a transformer bridge 800 having a pair of primary windings 801 and 802, separated by a DC isolation capacitor 805, and a pair of secondary windings 803 and 804 separated by a DC isolation capacitor 806. The primary windings 801 and 802 are connected to the tip T and ring R leads to the service link network 111 and connected to the primary windings and across the capacitor 805 is a calling bridge relay CB. The secondary windings 803 and 804 are connected to lines extending to an operator's position 215 and are also connected to a pair of relays T and R, respectively. The lines from the transformer bridge 800 which extend to the operator's position are connected to a typical plug jack arrangement 810 including a contact sleeve 811 and pair of contact terminals 812 and 813. The contact sleeve 811 is in turn connected through a relay S to a source of DC potential 815.

There may also be provided at the operator's position a call indicator in the form of a lamp or other indicating device 820 to which is connected a source of DC potential 821 upon actuation of the proper relays in the malicious call circuit to indicate to the operator that a malicious call situation has arisen. In addition to the call indicating device 820, there may also be provided a supervisory indicating device 825 which is connected to a source of DC potential 826 to provide a constant indication after the operator has responded to the malicious call indication that malicious call supervision is being conducted. While particular facilities at the operator's postion are described and illustrated in conjunction with the present invention, it should be understood that such arrangements are provided by way of example only and may be altered or supplemented by other known equipment which is capable of performing the functions necessary to provide proper supervision in accordance with the instant invention. The provision of such supervsory arrangements at the operator's position may be selected from known equipment in accordance with the particular design or requirements of the overall telephone system.

A pair of control relays H and AU are connected to the register control 206 via service link network 111 for purposes of controlling the malicious call circuit to effect application of tracing tone back to the calling line circuit and to effect a holding of the calling line circuit in spite of attempts by the calling subscriber to release the connection by replacing his handset. Tracing tone may be applied from the tracing tone source 830 directly to the voice transmission path via winding 807 in the case where the call is not locally originated but is applied via a trunk circuit, and this same tracing tone may be applied in the case of locally originated calls directly to the sleeve lead S to the service link network via a transformer connection including windings 831 and 832. In addition, a tape recording of the conversation between the calling and called subscribers may be obtained for purposes of facilitating further investigation through connection of a tape recorder 835 to the transmission bridge 800 by way of winding 808. The connection of the tape recorder 835 and the tracing tone generator 830 to the transmission bridge 800 is effected in a manner to be described more fully hereinafter upon response of the malicious call situation by the operator at the operator's position.

A relay RD is connected to a source of DC potential 838 and is energized upon energisation of the calling bridge relay CB to actuate the supervisory indicator 825 at the operator's position. This relay RD is a slow release relay, while the remaining relays in the malicious call circuit, with the exception of relay H, are normal release relays. The relay H is a latching relay which latches upon receipt of a positive pulse from the register control 206 and is maintained in the latched condition until a negative release pulse is applied from the register control.

Looking now to the operation of the malicious call circuit in accordance with the invention, as illustrated in FIG. 9, upon detection of a malicious call condition in the register control 206 in response to circuit conditions received from the supervisory processing circuit 201, the register control 206 provides for connection of the malicious call circuit to the service link network 111 and actuates the relay H in the malicious call circuit on application of a positive pulse thereto. This latching of the H relay completes the circuit to the call indicator 820 in the operator's position so as to signal the operator regarding the malicious call situation. The operator answers by closing the sleeve contact 811 to the contacts 812 and 813 simultaneously operating the relays S, R, and T.

Operation of the S relay removes the calling condition at the operator's position by breaking the circuit including the call indicator 820, and also serves to connect the transformer bridge 800 through the service lines T and R to the service link network 111. This extension of a loop into the service link network serves to actuate the calling bridge relay CB which effects actuation of the release delay relay RD through completion of the circuit including the relay and DC potential source 838. Actuation of relay RD completes the circuit including the supervisory indicator 825 at the operator's position which indicates that supervision of the call is in effect. This indicator will be actuated as long as the transmission bridge 800 is connected to the service link network 111.

A contact of the H relay connected in the sleeve lead S to the service link network 111 provides the holding ground for the cross points in the service network so as to maintain connection of the malicious call circuit and service link network 111 to the junctor 107 regardless of attempts on the part of the calling party to terminate the call. The holding ground is connected to the sleeve lead S upon actuation of the H relay through diode 840.

Operation of the relays R and T when the operator at the operator's position answers the call indication results in the connection of the tape recorder 835 to the transmission bridge 800 by way of winding 808, and connection of the tracing tone generator 830 either to the transmission bridge 800 via the winding 807 or to the sleeve lead in the case of locally originated calls by the transformer consisting of windings 831 and 832 and diode 833. As indicated previously, in the case of calls derived from trunk circuits, the register control 206 will actuate relay AU simultaneously with actuation of the relay H so as to provide connection of the tracing tone generator 830 directly to the voice path via the transmission bridge 800. If the relay AU is not energized, the tracing tone generator 830 will instead be connected to the sleeve lead where it is applied directly through the service link network 111 and junctor 107 to the line link network 102 for purposes of tracing the call.

In association with the invention, an arrangement such as described in application S.N. 552,283 of James Gordon Pearce et al. may be provided for effecting a simplified tracing of the call, such as a malicious call or any other type of call, through the enclosed cross point switches in the service link network 111 and line link network 102. The tracing of calls through a telephone switching system using enclosed cross point switches by visually inspecting switches as a step by step system is not possible. On the other hand, probing for tones through the cross point switches is a slow and tedious process which is not at all satisfactory. As a result, there is provided in the above-referenced application, a call tracing arrangement utilizing neon lamps at various switching stages to provide a visual indication of the path that a call takes through the system so that the line circiut which is sought to be traced may be detected very quickly and easily.

Referring now to the junctor circuit described and illustrated in connection with FIGS. 3A and 3B, when the malicious call answering circuit is connected through the service link network 111 to the junctor 107 and the operator has answered the call at the operator's position 215 to effect operation of the relay S thereby connecting the transmission bridge 800 in the malicious call circuit to the service link network, a sequential control of the relays in the junctor by the register control 206 is effected in order to provide proper connection through the junctor to the calling line circuit and make possible a release of the called subscriber from the system. As in all operations, the relay CO in the junctor is first operated through application of a positive pulse to the control line CO to the service link network 111. Operation of the relay CO serves to connect the control relays in the junctor to the service link network and isolate the subscriber line circuits from the service equipment. During the subsequent scan of the junctor, positive pulses are applied to the control leads CO, T and R to operate relay TK and relay RD. The operation of relay TK extends a dry loop toward the called line circuit by removal of battery from the called side of the transmission bridge 301 providing means for use of the junctor as an outgoing loop trunk when required. The application of a positive pulse to the relay RD, which was already in the latched condition to provide connection between the calling line circuit and the transmission bridge 3017 in the junctor is effected so as to insure that the connection to the calling party is maintained during the malicious call operation.

During the next scan of the junctor, a negative control pulse is applied to the control line CO to release the relay RT which effects a disassociation of the called line circuit from the transmission bridge 301 of the junctor. The next scan of the junctor effects release of the relay CO thereby connecting the called line circuit to the malicious call circuit via the junctor 107 and service link network 111. At the same time, the calling line circuit is split off from the called line circuit and from the malicious call circuit, but is prevented from releasing due to the extension of holding ground from the junctor.

During the next scan of the junctor, the relay CO is operated through application of a negative pulse to the control line CO from the register control 206. Subsequent to operation of the relay CO, negative control pulses are applied to the control lines MK and R from the service link network 111 to release the relays S, R and TK. The application of the negative control pulse to the relay CO in operation thereof also serves to release the relay RT during the release of the called subscriber effected by release of the relay TK. During the next scan of the junctor, the relay RT is reoperated so that upon subsequent release of the relay CO the malicious call circuit will be connected through the service link network 111 and transmission bridge 301 in the junctor 107 to the calling line circuit. The holding ground for the calling line circuit is then extended forward from the malicious call circuit through actuation of the holding relay H therein so that any subsequent attempt on the part of the calling party to release the connection will be unsuccessful.

To avoid interference with other functions, such as class of service marking or toll ticketing identification, the tracing tone generator provides time divided pulses so that call marking is achieved at different intervals from the other desired functions. The pulses applied from the tracing tone generator to the sleeve lead S to the service link network 111 are synchronized with the other function pulses in a manner illustrated in FIG. 10. It is apparent from the tracing tone pulses in line (a) as compared in time with the pulses representing toll ticketing identification in line (b) and class of service information in line (c) of the figure that the pulses are applied to the sleeve lead in synchronism so as to avoid interference.

As already indicated, in the event that the originating call is incoming from a trunk, the tracing tone is applied to the speech path via the transmission bridge 800 in the malicious call circuit which applies the tracing tone directly to the trunk circuit rather than to a sleeve lead connected to the service link network, as is done in the case of locally originated calls. Arrangements are then provided in accordance with the invention for providing a terminal device at the exchange associated with the originating line circuit so as to intercept the tracing tone from the speech path and apply it to the sleeve lead S for subsequent call tracing. One such arrangement of a terminal device in accordance with the invention is illustrated in FIG. 11. Incoming transmission lines 910 and 911 from the trunk network are connected to a filter network 912 which passes all but a narrow band of frequencies which includes the frequency of the tracing tone applied from the malicious call circuit. In addition, a tuned circuit consisting of capacitor 913 and inductance 914 is connected in parallel with the filter 912 and is tuned to the frequency of the tracing tone so as to extract the tracing tone from the speech path. The inductance 914 forms one winding of a transformer along with secondary winding 915 which receives the tracing tone filtered from the transmission circuit and applies it to amplifier 916. The signal is amplified in the amplifier and applied to an integrating circuit 917 which shapes the pulse for application to holding relay HD. The holding relay HD, integrator 917, amplifier 916 and secondary winding 915 form a series circuit which serves to actuate the holding relay upon application of a suitable control signal from a filter circuit.

Actuation of the holding relay HD connects the secondary winding 918 of a transformer including primary winding 919 to the sleeve lead S connected to the service link network 111 of the exchange. The primary winding 919 is in turn connected to a local pulse source which provides a tracing signal for application to the service link network on the sleeve lead S. Exchange having tandem and local trunks require the interposition of the terminal device, such as illustrated in FIG. 11, at the point of the combining of local and tandem traffic. The control from the relay HD provides a means of holding the switch train through application of a ground connected to the secondary winding 912 to the sleeve lead S keeping the calling circuit open even if the calling subscriber attempts to terminate the connection by replacing the handset.

The functioning of the supervisory processing circuit in connection with the information stored in the junctor memory is such that even when the calling subscriber attempts to release the connection, supervision from the supervisory processing circuit for release of the common equipment is not effected, due to the combination indication in the junctor memory of a malicious call class of service with an "event recorded bit" written into position 4 of character C of the memory and at the time that the malicious call circuit is connected to the line link network 111.

The release of the malicious call circuit is effected by simultaneous release of the relays TR in the malicious call circuit when the operator releases the connection at the operator's position. With release of the relays T and R and release of the latching relay H through control of the register control 206, the application of tracing tone to the system is eliminated and the normal release sequence can be effected in the manner previously described in connection with the junctor release circuit.

While we have shown and described several embodiments in accordance with the instant invention, it is understood that the same is not limited thereto but is susceptible of numerous changes and modifications as known to a person skilled in the art, and we therefore do not wish to be limited to the details shown and described therein but intend to cover all such changes and modifications as are encompassed by the scope of the appended claims.

We claim:

1. In combination with a telephone system including junctor means interconnecting calling and called subscriber line circuits with each other and with common supervisory equipment on a time share basis and having sensing means for sensing the open and closed line conditions, memory means for indicating the status of a call between calling and called subscribers and for indicating the availability of a malicious call class of service, holding means in said junctor means for holding the connection to respective calling and called line circuits, and junctor release means for selectively releasing said holding means, a malicious call circuit for connection to said junctor means by said supervisory equipment in response to prescribed conditions comprising auxiliary holding means non-responsive to said junctor release means for holding the connection of said junctor means to at least said calling line circuit, and control means responsive to indication from said memory means and said sensing means that a flashing signal has been received from the called line circuit after the call has been completed in connection with a called line circuit having a malicious call class of service for automatically connecting said auxiliary holding means to said junctor means via said common supervisory equipment.

2. The combination defined in claim 1 wherein said malicious call circuit further includes tracing signal generator means for generating a tracing signal, and actuating means for selectively connecting said tracing signal generator means to said junctor means.

3. The combination defined in claim 2 wherein said common supervisory equipment includes a service link network for connecting said malicious call circuit to said junctor means and register control means for controlling said service link network in response to line conditions detected by said sensing means, said register control means being connected for operation of said control means, said malicious call circuit including a pair of transmission lines interconnecting a transformer bridge via said service link network to said junctor means and a supervisory control line extending to said service link network, said auxiliary holding means being connected to said supervisory control line for connection of a holding ground thereto.

4. The combination as defined in claim 3 further including first indicating means responsive to said control means for providing indication of operation thereof, and third relay means actuated by said actuating means for disabling said first indicating means and connecting said transformer bridge to said service link network.

5. The combination as defined in claim 3 further including recording means and first relay means connected to said transformer bridge and actuated by said actuating means for connecting said recording means to said transformer bridge on an inductively coupled basis for recording conversation from said subscriber line circuits.

6. The combination defined in claim 3 further including second relay means connecting said signal generator means to said supervisory control line in the de-energized condition thereof and to the transformer bridge on an inductively coupled basis in the energized condition thereof, said register control means being connected to energize said second relay means in response to connection of said service link network to said transformer bridge through a trunk circuit.

7. The combination as defined in claim 6 wherein said tracing signal generated by said tracing signal generator is of the predetermined frequency and said service link network is connected through a trunk line to said transformer bridge, and further including filter means connected to the service link network side of said trunk line for extracting said tracing signal therefrom and fourth relay means connected to said filter means for actuation by said tracing signal, and means enabled by said fourth relay means for applying a tone signal and a holding ground to said supervisory control line connected to said service link network.

8. The combination as defined in claim 3 further including first indicating means responsive to said control means for providing indication of operation thereof, and manually operable means for energizing said actuating means to connect said generator means to said service link network.

9. The combintion as defined in claim 8 further including a transformer bridge, a pair of transmission lines interconnecting said transformer bridge and said service link network for association of said transformer bridge with said subscriber circuits through said junctor means, a supervisory control line extending to said service link network, and first relay means responsive to said manually operable means for connecting said tracing signal generator means to said supervisory control line.

10. The combination according to claim 9 further including recording means for recording voice communication, and second relay means for connecting said recording means to said transformer bridge on an inductively coupled basis.

11. The combination as defined in claim 8 further including a transformer bridge, a trunk line circuit connecting said transformer bridge to said service link network for association of said transformer bridge with said subscriber circuits through said junctor means, said actuating means connecting said tracing signal generator to said transformer bridge on an inductively coupled basis.

12. The combination as defined in claim 11 further including third relay means for connecting said transformer bridge to said trunk line circuit in response to actuation of said manually operable means.

13. The combination as defined in claim 12 wherein said tracing signal is of a predetermined frequency, and further including filter means connected to the service link network side of said trunk line for extracting said tracing signal therefrom, fourth relay means connected to said filter means for actuation by said tracing signal, a supervisory control line connected to said service link network, and means enabled by said fourth relay means for applying a tone signal and holding ground to said supervisory control line.

References Cited

UNITED STATES PATENTS 3,385,933 5/1968 Abert et al. ---------- 179—18

KATHLEEN H. CLAFFY, Primary Examiner

T. W. BROWN, Assistant Examiner